(12) United States Patent
Masuyama

(10) Patent No.: US 8,654,380 B2
(45) Date of Patent: Feb. 18, 2014

(54) IMAGE FORMING APPARATUS, CONTROL METHOD, AND STORAGE MEDIUM FOR RECEIVING A VARIABLE PRINT JOB HAVING A PLURALITY OF RECORDS

(75) Inventor: Yuka Masuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 12/830,196

(22) Filed: Jul. 2, 2010

(65) Prior Publication Data

US 2011/0007340 A1   Jan. 13, 2011

(30) Foreign Application Priority Data

Jul. 7, 2009   (JP) ................................. 2009-160757

(51) Int. Cl.
G06F 3/12       (2006.01)
G06K 15/00    (2006.01)
G06F 11/00    (2006.01)

(52) U.S. Cl.
USPC ........... 358/1.15; 358/1.16; 358/1.14; 714/48

(58) Field of Classification Search
None
See application file for complete search history.

(56) References Cited

U.S. PATENT DOCUMENTS

2008/0030763 A1   2/2008 Kitada
2009/0073482 A1*  3/2009 Tsuchiya .................... 358/1.14

FOREIGN PATENT DOCUMENTS

JP   20070305119 A   11/2007

* cited by examiner

*Primary Examiner* — Thomas Lett

(74) *Attorney, Agent, or Firm* — Canon USA, Inc. IP Division

(57) ABSTRACT

An apparatus for receiving a variable print job having a plurality of records including page information of a plurality of pages, and based on the page information, outputting an output product including a master object and a variable object includes a reception unit for receiving a print job, an output unit for executing output processing for outputting the received print job as the output product, a detection unit for detecting an error occurring during the output processing, and a control unit, when the print job in which an error is detected is the variable print job, interrupting the output processing of the record, and restarting output processing from a page included in a record following the record in which the error is detected.

18 Claims, 21 Drawing Sheets

FIG. 3

| CUSTOMER NUMBER | NAME | ADDRESS | AGE | Master | Course 1 | Course 2 | Detail |
|---|---|---|---|---|---|---|---|
| 00111 | YAMADA | KANAGAWA PREFECTURE | 26 | Link 1 | A COURSE | B COURSE | XX |
| 00456 | SUZUKI | TOKYO METROPOLIS | 39 | Link 1 | C COURSE | B COURSE | YY |
| 00684 | SATO | HOKKAIDO | 55 | Link 1 | A COURSE | D COURSE | XX |

```
<?XML version-"1.0" endcoding-"uff-8" ?>
<PPML>
<JOB>
<DOCUMENT SET>
<REUSABLE OBJECT>
 REUSABLE OBJECT Title (TITLE)
 REUSABLE OBJECT Course 1 (COURSE 1)
 REUSABLE OBJECT Course 2 (COURSE 2)
 REUSABLE OBJECT Details (DETAIL)
</REUSABLE OBJECT>

<DOCUMENT>
<PAGE>
 VARIABLE DATA A1
 REUSABLE OBJECT TITLE REFER TO
 REUSABLE OBJECT COURSE 1 (A1) REFER TO
 REUSABLE OBJECT COURSE 2 (A1) REFER TO
</PAGE>
<PAGE>
 REUSABLE OBJECT DETAILS (A1) REFER TO
</PAGE>
<DOCUMENT>

<DOCUMENT>
<PAGE>
 VARIABLE DATA A2
 REUSABLE OBJECT TITLE REFER TO
 REUSABLE OBJECT COURSE 1 (A2) REFER TO
 REUSABLE OBJECT COURSE 2 (A2) REFER TO
</PAGE>
<PAGE>
 REUSABLE OBJECT DETAILS (A2) REFER TO
</PAGE>
<DOCUMENT>
      .
      .
      .
      .
<DOCUMENT SET>
</JOB>
</PPML>
```

IMAGE FORMING APPARATUS, CONTROL METHOD, AND STORAGE MEDIUM FOR RECEIVING A VARIABLE PRINT JOB HAVING A PLURALITY OF RECORDS

BACKGROUND OF THE INVENTION

1. Field of the Invention

The present invention relates to an image forming apparatus capable of printing a variable print job, and a control method and a storage medium thereof.

2. Description of the Related Art

The demand for variable data printing, in which data suited for the needs of each customer, is increasing. Since the customer data registered in a single job is printed by respective record unit, a variable data job (VDP job) includes a large number (e.g., several tens of thousands of records) of records in a single job. In a VDP job, a VDP object is associated with each record. A master output which will serve as a background is composited with the VDP object, and the resultant data is printed. Such a VDP job is managed by job unit even if a plurality of records are included.

However, since jobs including a large number of records are managed by job unit, cases occur in which the print processing cannot be efficiently performed. An example of this is when printing cannot be performed due to some kind of error occurring in a record included in the VDP job. Examples of errors that occur by record unit in the VDP job include a case in which the VDP object to be referenced by a predetermined record is not present in a designated reference destination, and a case in which a paper sheet designated by a predetermined record unit is not set in a sheet feed stage.

A conventional printing system has a suspend/promote function that, by job unit, allows printing to continue by suspending an unprintable job, and promoting the next executable job in the print queue. However, in this conventional function, when an error occurs by record unit included in the VDP job, the whole job in which the error occurred is suspended, and the following printable job is promoted.

Consequently, printing cannot be continued even if the record following the record in which the error has occurred is a printable record, which is inefficient. Further, a record, which has already been printed, becomes a print target during reprinting, so that unnecessary printing occurs.

In addition, a conventional printing system has an error skip function for skipping the printing of the page in which the error has occurred by page unit in a normal page description language (PDL) job, so that the remaining pages in the job can be printed. However, this error skip function operates by page unit. Therefore, this function is unsuitable for a case in which the respective records included in the VDP job are configured from a plurality of pages.

Thus, the conventional skip function which functions only by job unit or page unit is not optimal for VDP jobs having a plurality of records. Japanese Patent Application Laid-Open No. 2007-305119 discusses a method in which the accessibility of the VDP object to be used during VDP printing is checked in advance. If there is a VDP object that cannot be accessed, at that point the system notifies the operator and cancels the print processing.

However, in the method discussed in Japanese Patent Application Laid-Open No. 2007-305119, the whole job is cancelled when there is a VDP object that cannot be accessed. Therefore, because access is impossible when executing printing, although the whole job is prevented from being cancelled, a printable record cannot be printed, which is inefficient.

SUMMARY OF THE INVENTION

According to an aspect of the present invention, an apparatus for receiving a variable print job having a plurality of records formed from page information about a plurality of pages, and based on the page information, outputting an output product formed from a master object and a variable object, includes a first reception unit configured to receive a print job, an output unit configured to execute output processing for outputting the received print job received as the output product, a detection unit configured to detect an error occurring during execution of the output processing, and a control unit configured to, when the print job in which the error is detected is the variable print job, interrupt the output processing of the page included in the record which includes page information about the page in which the error is detected, and of the records included in the variable print job, restart output processing from a page included in a record following the record which includes the page information about the page in which the error is detected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a table illustrating an example of a record database.

DESCRIPTION OF THE EMBODIMENTS

Various exemplary embodiments, features, and aspects of the invention will be described in detail below with reference to the drawings.

Figure 1:
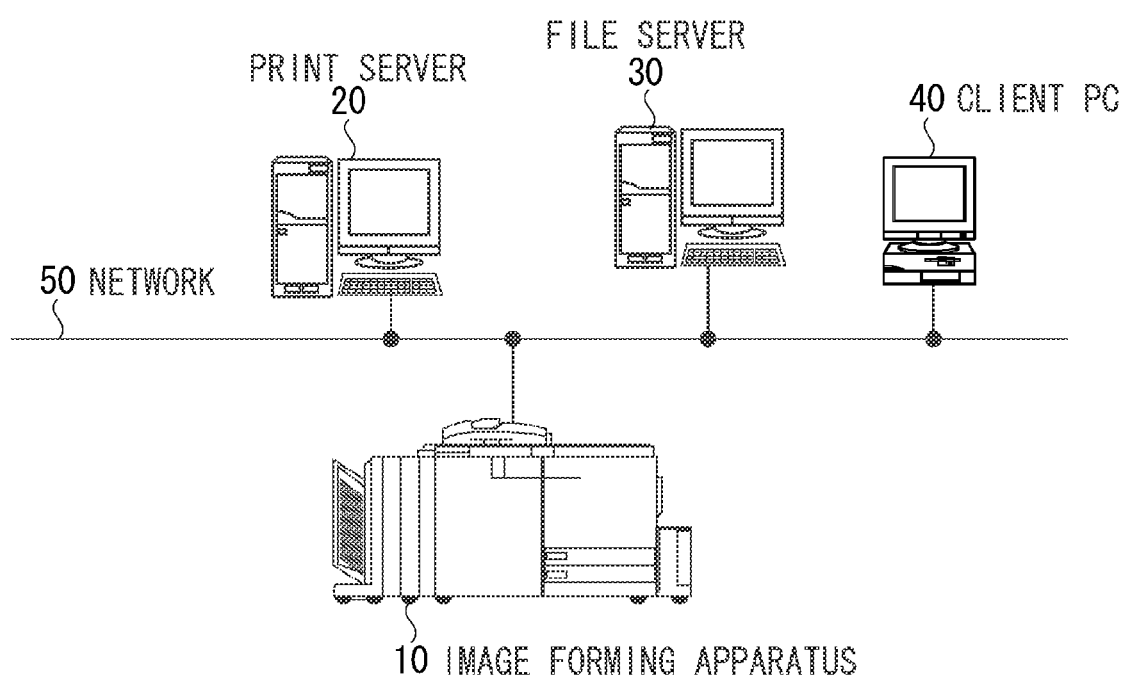
FIG. 1 is a configuration diagram of a system including a computer according to a first exemplary embodiment of the present invention.

First, an image forming system, to which the below-described various exemplary embodiments can be applied, will be described using FIG. 1. FIG. 1 is a configuration diagram illustrating an example of a basic configuration of an image forming system according to a first exemplary embodiment of the present invention. The image forming system has an image forming apparatus 10, a print server 20, a file server 30, and a client PC 40. The image forming apparatus 10, the print server 20, the file server 30, and the client PC 40 are communicably connected via a network 50 such as a local area network (LAN) or a wide area network (WAN).

The image forming apparatus 10 has various functions, such as scanning, printing, and copying. The print server 20 manages input print jobs, and the image forming apparatus 10, which is connected via the network 50. The print server 20 can not only monitor the state of the connected image forming apparatus 10 and the state of all of the print jobs, but also can perform controls such as temporary pause of a print job, setting changes, printing restart, or job replication, transfer, deletion and the like.

The file server 30 stores a database relating to variable data used in variable printing, for example, a customer database including customer data such as destination, address, name, and the like. The client PC 40 has functions for editing application files and print support. Further, the client PC 40 has functions for monitoring the image forming apparatus 10 and the print jobs, which are managed by the print server 20, and for assisting the control thereof. An operator can confirm the status of a job by utilizing the client PC 40.

Figure 2:
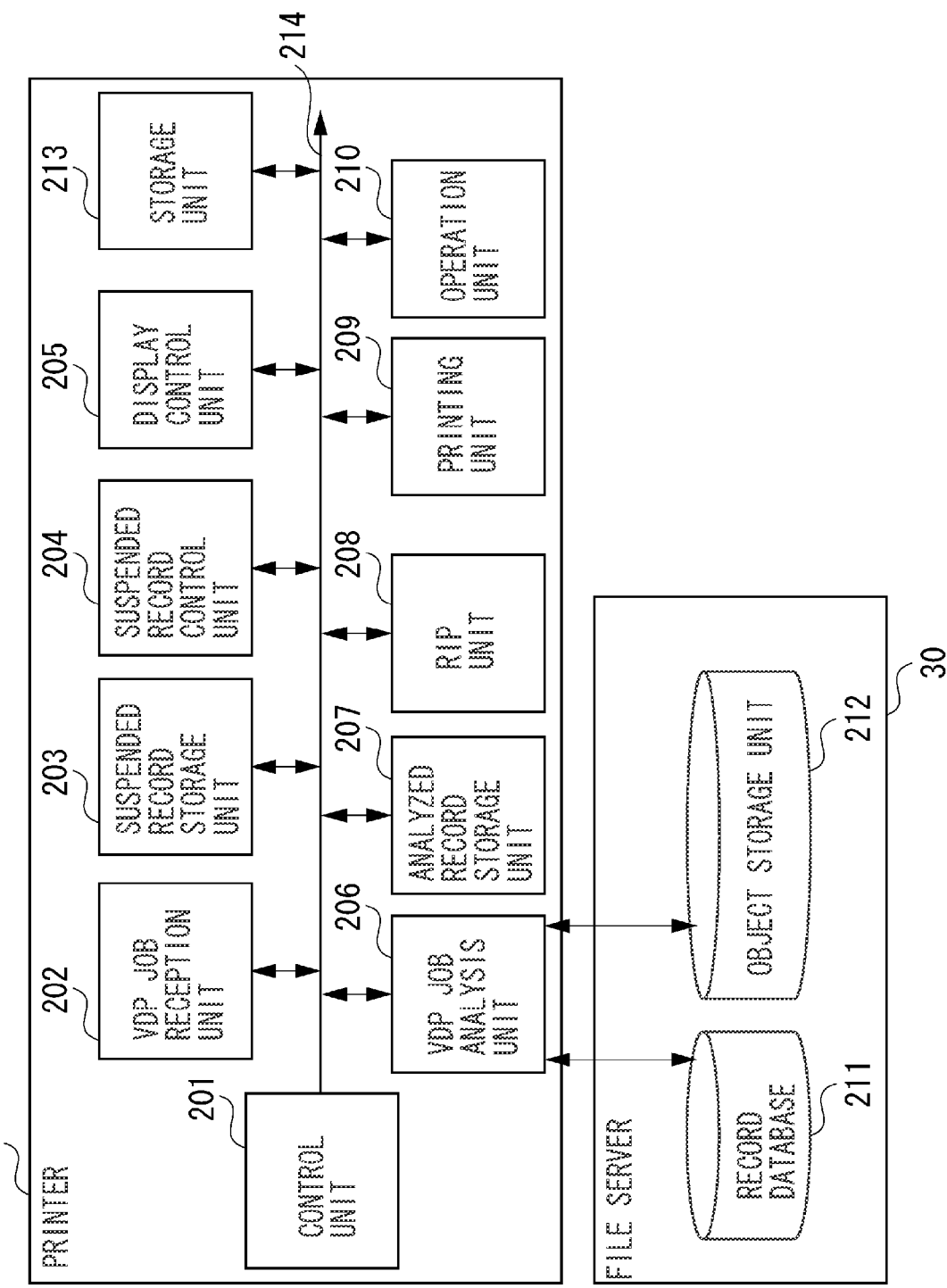
FIG. 2 is a block diagram of a system of a typical image forming apparatus according to the first exemplary embodiment of the present invention.

FIG. 2 is a block diagram illustrating a basic configuration of the image forming apparatus 10. A control unit 201 controls each of the units connected via a system bus 214, and controls the whole operation of the image forming apparatus 10. Further, the control unit 201 controls each unit of the image forming apparatus 10 by executing a program stored in a storage unit 213.

An operation unit 210 is provided to allow the operator to perform various inputs. The operation unit 210 is configured from various keys and a display device formed from a liquid crystal display (LCD) and light-emitting diodes (LED) provided with a touch panel function. Based on operations performed by the operator on this operation unit 210, a reprint instruction or a job cancel instruction is received.

A display control unit 205 performs various displays on a display device of the operation unit 210. For example, the display control unit 205 displays a suspended record detection notification message on the operation unit 210 during printing to prompt the operator to perform the next process.

A VDP job reception unit 202 receives a VDP job input via the print server 20 when a print instruction is issued from the client PC 40. Further, when there is a VDP job processing instruction, the VDP job reception unit 202 sends the received VDP job to a VDP job analysis unit 206. The received VDP job may include page information for outputting a page for each page in the records included in the job, like in a personalized printer marked language (PPML) format.

Examples of page information include information indicating a correspondence relationship between a VDP object and a master object, information about the media to be used during output, color/monochrome output information, post-processing information, discharge destination information, and the like. In the present exemplary embodiment, the VDP job has a plurality of records configured from page information for a plurality of pages. By performing output processing by the below-described various configurations, based on the page information included in the records, an output product, which is configured from a master object that is fixed for each record and a variable VDP object that is variable for each record, is output.

VDP jobs suitable for the present invention are not limited to the above-described configuration. For example, information indicating the correspondence relationship between the VDP object and the master object may be pre-stored in the file server 30, and not included in the VDP job.

The VDP job analysis unit 206 analyzes the records of the VDP job received from the VDP job reception unit 202, and gives an ID to the plurality of records included in the VDP job. Further, as a result of the analysis, the VDP job analysis unit 206 may optionally refer to a record database 211, which is stored in the file server 30.

The VDP job analysis unit 206 also associates the VDP object to be used for each page with the master object based on the page information included in the VDP job or based on the referred record database 211. The VDP objects and the master object are stored in an object storage unit 212.

At this stage, the VDP job analysis unit 206 confirms whether each object can be accessed. If an object cannot be accessed, the VDP job analysis unit 206 performs the below-described suspension processing. The VDP job analysis unit 206 sends analyzed record information and the ID of that record to an analyzed record storage unit 207. The processing performed by the VDP job analysis unit 206 will be generically referred to below as "analysis processing". The analyzed record storage unit 207 associates the record information and the ID of that record, which are received from the VDP job analysis unit 206 with each other, and stores the resultant data.

A raster image processing (RIP) unit 208 refers to the record information stored in the analyzed record storage unit 207 in response to an instruction from the control unit 201. The RIP unit 208 also performs raster image processing on the VDP object and master object of each page included in the records, and generates print data. The objects, which have undergone raster image processing and generated during the raster image processing, may be stored in a reusable state as a reusable object in the RIP unit 208.

A printing unit 209 performs print processing (printing of print data on a recording sheet) for print data that has undergone raster image processing by the RIP unit 208, and discharges the output product. Based on printing information added to each record in the printing unit 209, the printing unit 209 requests the media, and discharges the output product in the finishing setting and designated discharge format.

Further, in the present exemplary embodiment, the respective processes of the VDP job analysis processing, the raster image processing, and the print processing performed until the received VDP job is output as the output product are collectively referred to as "output processing".

The suspended record control unit 204 controls suspension processing, which is executed when processing is interrupted due to an error occurring during the respective processes of the VDP job analysis processing, the raster image processing, and the print processing. Details concerning the suspension processing will be described below.

A suspended record storage unit 203 temporarily stores record information, which will become the target of suspension processing in response to an instruction from the suspended record control unit 204. Further, if there is an instruction to reprint the suspended record, the suspended record storage unit 203 also stores the record information about the suspended record after the job has finished.

FIG. 3 is a table illustrating an example of a database stored in the record database 211. In FIG. 3, reference numerals 301 to 307 denote respective data fields in the database. FIG. 3 includes data fields such as customer number 301, name 302, address 303, age 304, master file link destination 305, course 1 306, course 2 307, and detailed information 308. In FIG. 3, the link destination of which the respective course or detailed information objects are stored may also be registered.

Figure 4:
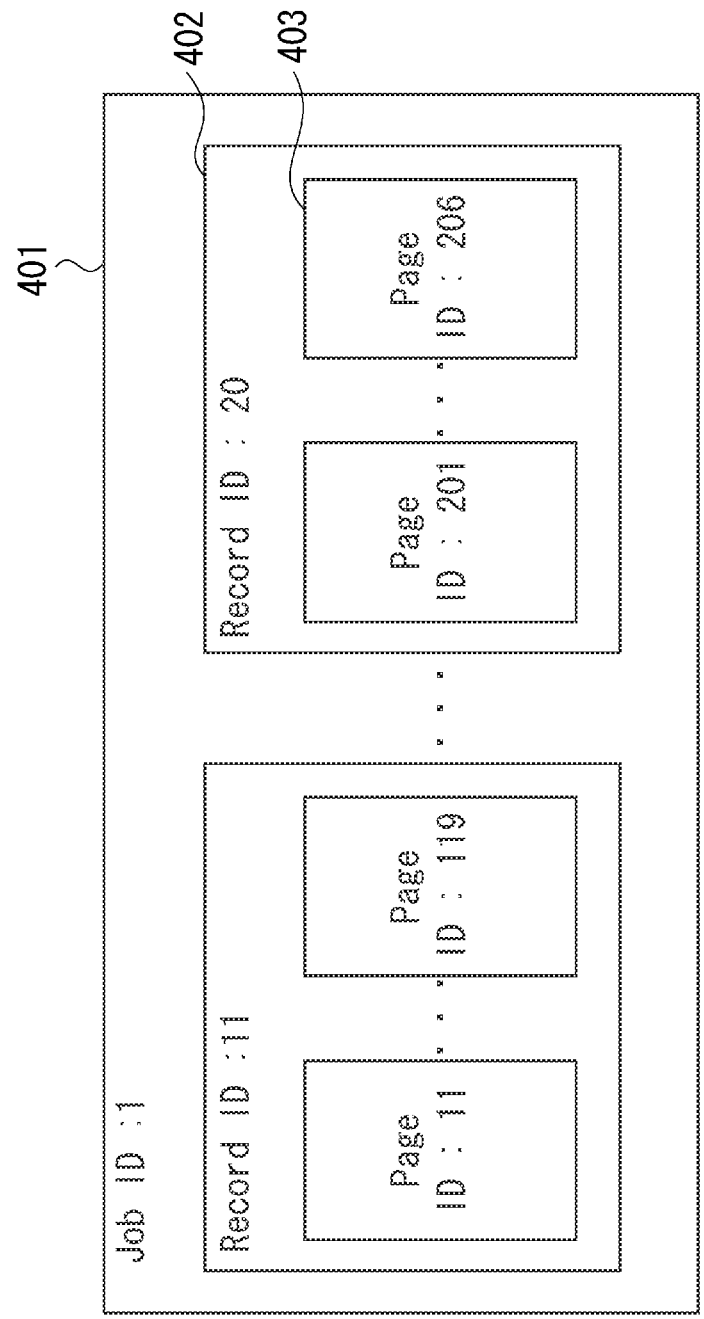
FIG. 4 illustrates an example of a layered structure formed from a job, records, and pages.

FIG. 4 is a schematic diagram illustrating the VDP job, records, and pages in a layered structure according to the present invention. A VDP job 401 has a plurality of records 402. Record information, which acts as the basis of the records 402, is stored in the file server 30.

In the present exemplary embodiment, the number of customers registered in the record database is the number (record number) of records 402 serving as the print target. Each record 402 includes one or more pages 403. The number of pages in each record 402 does not have to be the same. This number is can be different depending on the printing contents instructed for each record 402.

In the present exemplary embodiment, the VDP job analysis unit 206 analyzes the VDP job, and assigns an ID to each record 402. Utilizing this record ID, the suspended record control unit 204 specifies the record to be managed. Further, not only for the records, a job ID is assigned to the VDP job, and a page ID is assigned to the pages.

Figure 5:
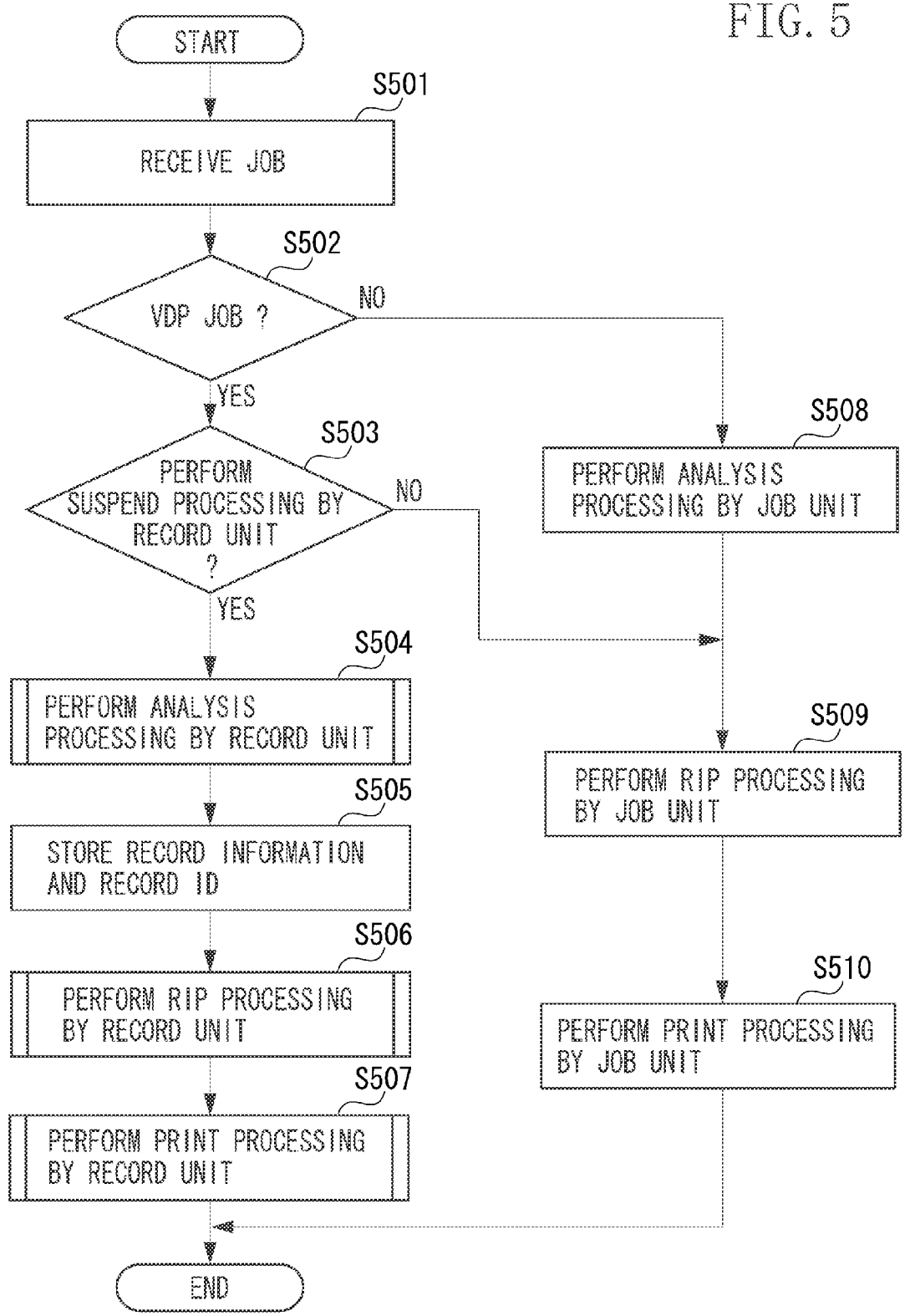
FIG. 5 is a flowchart of job print processing.

FIG. 5 illustrates a basic flow from when the image forming system according to the present exemplary embodiment receives a VDP job until the output product is discharged. The processing performed in each step of the flow illustrated in FIG. 5 is executed by the control unit 201 controlling the respective units of the image forming apparatus 10 based on a program stored in the storage unit 213.

In step S501, the VDP job reception unit 202 receives a job sent from the print server 20. In step S502, the VDP job reception unit 202 determines whether the received job is a VDP job. If it is determined that the received job is a VDP job (YES in step S502), the processing proceeds to step S503. On the other hand, if it is determined that the received job is not a VDP job (NO in step S502), the processing proceeds to step S509.

In step S503, the VDP job reception unit 202 determines whether a setting for performing suspension processing by record unit for the VDP job is set. If it is determined that a setting for performing suspension processing by record unit is set (YES in step S503), the processing proceeds to step S504. On the other hand, if it is determined that a setting for performing suspension processing by record unit is not set (NO in step S503), the processing proceeds to step S508.

The setting for performing suspension processing by record unit is set by the control unit 201 based on an operation performed by the operator on the operation unit 210 of the image forming apparatus 10. This setting method will be described in more detail below. Further, in step S503, the VDP job reception unit 202 performs the determination by confirming the setting relating to suspension processing by record unit set by the image forming apparatus 10 with the control unit 201.

This setting is not limited to a setting by the image forming apparatus 10. The setting may also be set for the VDP job in response to an instruction from the operator using an information processing apparatus such as the print server 20, client PC 40 or the like. In such a case, the VDP job reception unit 202 performs the determination by confirming setting information about the suspension processing included in the VDP job.

In step S504, the VDP job analysis unit 206 performs below-described analysis processing by record unit. In step S505, the analyzed record storage unit 207 associates the record ID given to each record in step S504 with the record information for each analyzed record, and stores the resultant data.

In step S506, the RIP unit 208 generates print data by referring to the record information stored in the analyzed record storage unit 207 and performing raster image processing by record unit. In step S507, the printing unit 209 performs print processing by record unit on the print data, which underwent raster image processing in step S505, discharges the output product, and then ends the processing flow. Details concerning the raster image processing by record unit and the print processing by record unit will be described below.

In step S508, the VDP job analysis unit 206 performs analysis processing by job unit. In step S509, the RIP unit 208 performs raster image processing by job unit on jobs other than the VDP job or on the VDP job analyzed in step S508.

In step S510, the printing unit 209 performs print processing by job unit on the print data, which underwent raster image processing in step S509, discharges the output product, and then ends the processing flow. Details concerning the raster analysis processing by job unit, the raster image processing by job unit, and the print processing by job unit will be described below.

Figure 6:
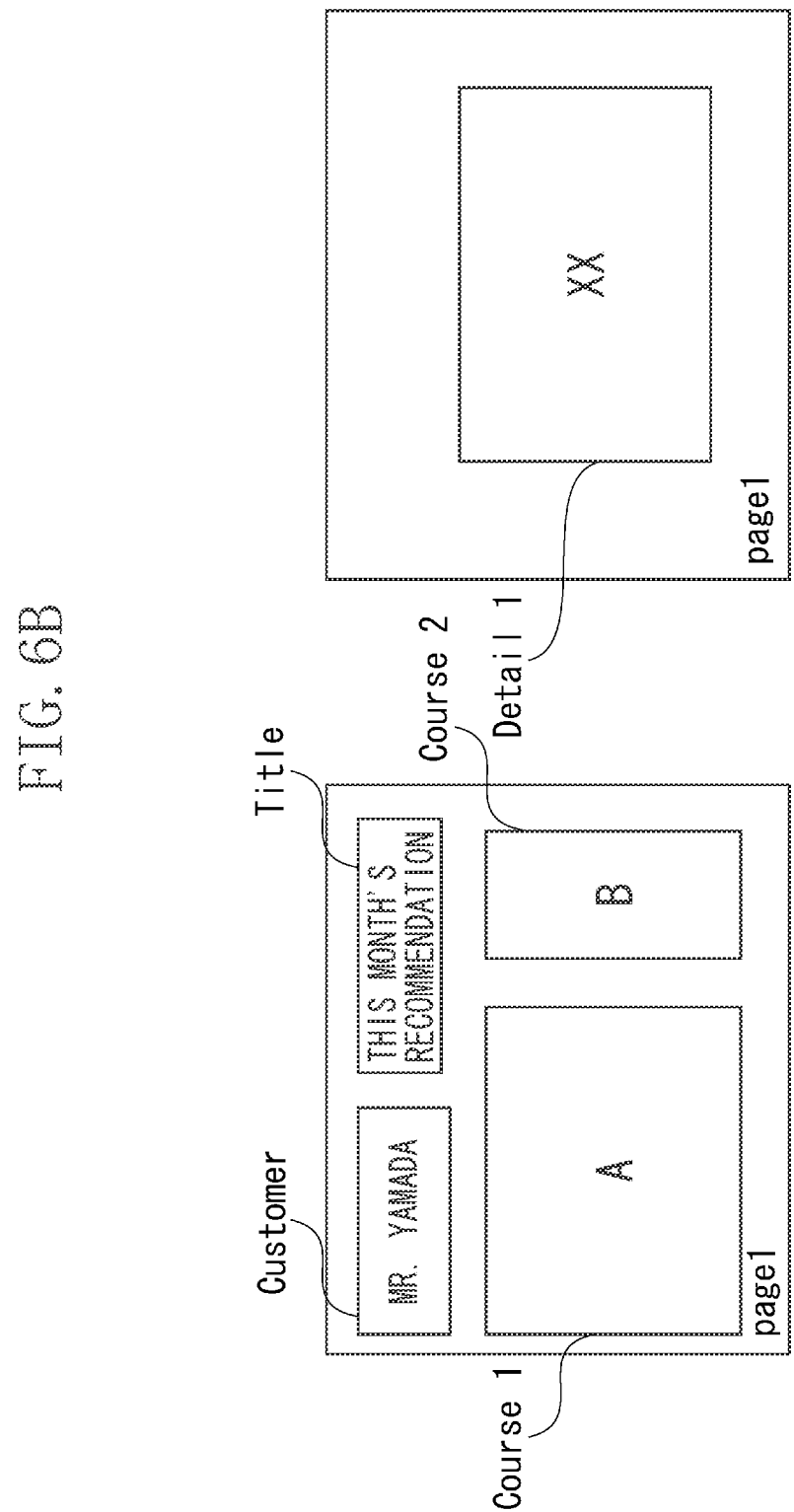
FIG. 6A illustrates an example of a PPML file of a VDP job.
FIG. 6B illustrates an example of an output product of a VDP job.

FIG. 6A illustrates an example of a PPML file, which is one type of VDP job. FIG. 6B illustrates an output product corresponding to one record in a PPML file. For the PPML file illustrated in FIG. 6A, one record is composed of two pages, in which a composite product of a VDP object and a reusable object (master object) is output based on the database illustrated in FIG. 3.

In the first page of each record, information indicating a reference destination of the variable object to be referred to and information indicating a reference destination of the reusable object are described. The variable object "A1" is information indicating a first piece of information in the database of FIG. 3 as the reference destination.

In this case, the field of the Course 1 of the first piece of data in the database of FIG. 3 is "A Course". Therefore, the VDP object corresponding to the "A Course" in the portion of the reusable object Course 1 is selected from the object storage unit 212, and associated with the corresponding "A Course".

In the PPML file illustrated in FIG. 6A, a <Document> tag is added to each record. Further, the records in each document have <Page> tags for two pages. The VDP job analysis unit 206 can recognize the records and the pages by using these tags.

The tag for distinguishing the records does not have to be a <Document> tag. For example, a comment added by the application generating the PPML file may be used. Alternatively, in some cases it is not necessary to add a tag for distinguishing the records.

Figure 7:
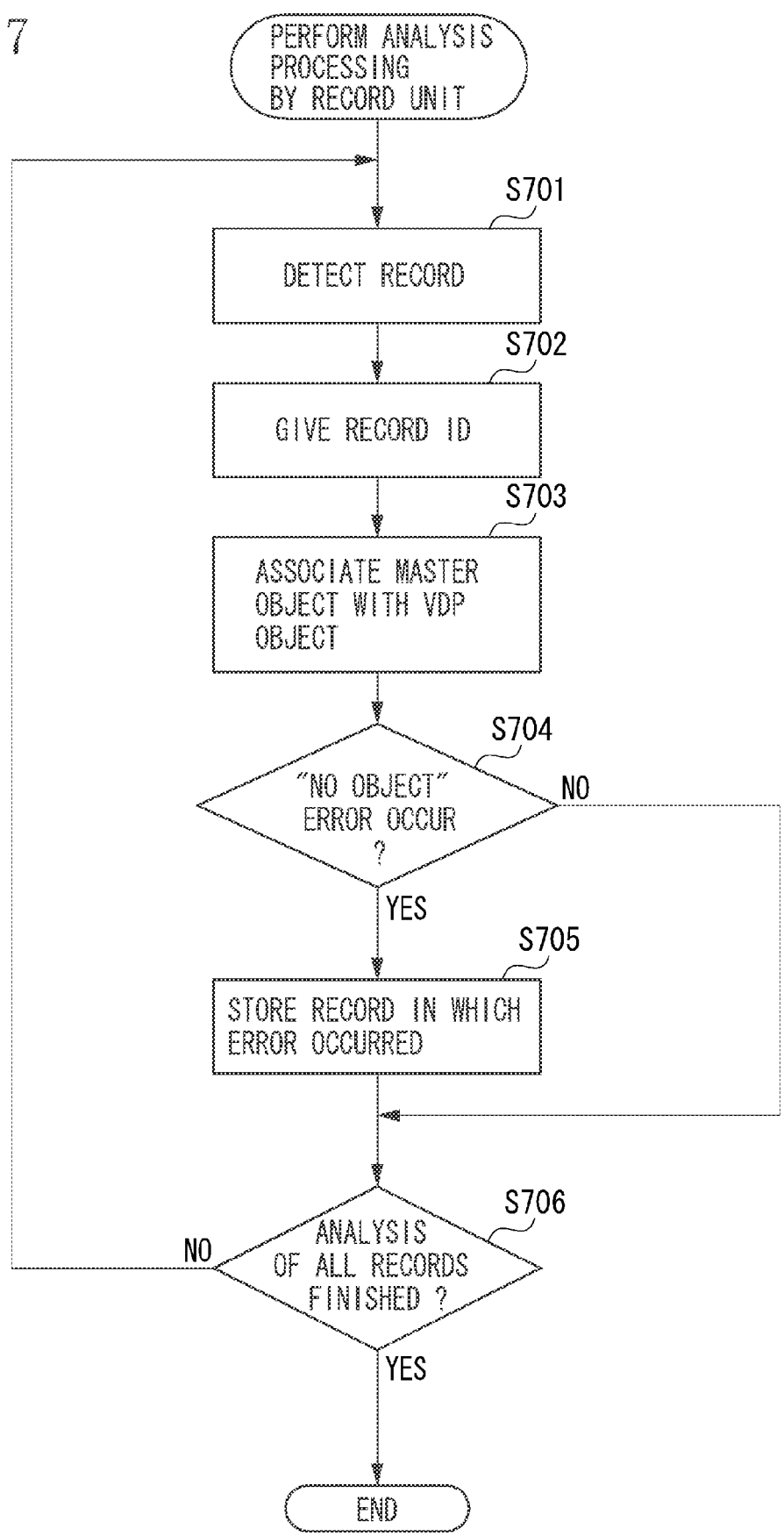
FIG. 7 is a flowchart of record unit analysis processing.

FIG. 7 is a flowchart illustrating in more detail the analysis processing by record unit performed in step S504 of FIG. 5.

The processing performed in each step of the flow illustrated in FIG. 7 is executed by the control unit 201 controlling the respective units of the image forming apparatus 10 based on a program stored in the storage unit 213.

In step S701, the VDP job analysis unit 206 detects the next record based on the document tag added to the received VDP job. The detection method is not limited to this method. Any method suitable for the configuration of the VDP job may be employed. In step S702, the VDP job analysis unit 206 gives a record ID, which is identification information for identifying the record, to the detected record.

In step S703, the VDP job analysis unit 206 refers to the file server 30 and the object storage unit 212 based on the description of the VDP job, and associates the VDP object to be used in output of the record with the master object.

In step S704, the VDP job analysis unit 206 determines whether an error has occurred by detecting errors caused by a link destination object not being present during the association processing performed in step S703. If it is determined that an error occurred (YES in step S704), the processing proceeds to step S705. If it is determined that an error did not occur (NO in step S704), the processing proceeds to step S706.

In step S705, the VDP job analysis unit 206 interrupts the analysis processing of the plurality of pages included in the record having a page in which an error occurred. Then, the VDP job analysis unit 206 notifies the suspended record control unit 204 of the record (suspended record) having a page in which an error occurred.

The suspended record control unit 204 stores the suspended record, for which notification is received, in the suspended record storage unit 203. Further, the VDP job analysis unit 206 holds the record ID of the record which is currently being analyzed, and when an error occurs, specifies the suspended record based on the held record ID.

Moreover, this specification is not limited to the above-described method. Based on the page ID of the page in which the error has occurred, the record including that page ID may be specified as the suspended record. In addition, in the following description as well, the specification of the suspended record is performed by the various processing units (VDP job analysis unit 206, RIP unit 208, and printing unit 209) based on the above-described method.

In step S706, the VDP job analysis unit 206 determines whether analysis processing of all the records included in the VDP job is finished. If it is determined that analysis processing of all records is finished (YES in step S706), the VDP job analysis unit 206 ends the processing flow. If it is determined that analysis processing of all records is not finished (NO in step S706), the processing returns to step S701, and analysis processing of the next analysis target record starts.

Next, the analysis processing by job unit performed in step S508 of FIG. 5 will be described.

In the analysis processing by job unit, the VDP job analysis unit 206 associates the master object with the VDP object to be used in output for all of the pages included in the job. This association method is the same as for the record unit analysis processing. Further, if an error is detected during the association, the control unit 201 interrupts the whole VDP job, and promotes the next job stocked in the image forming apparatus 10.

Figure 8:
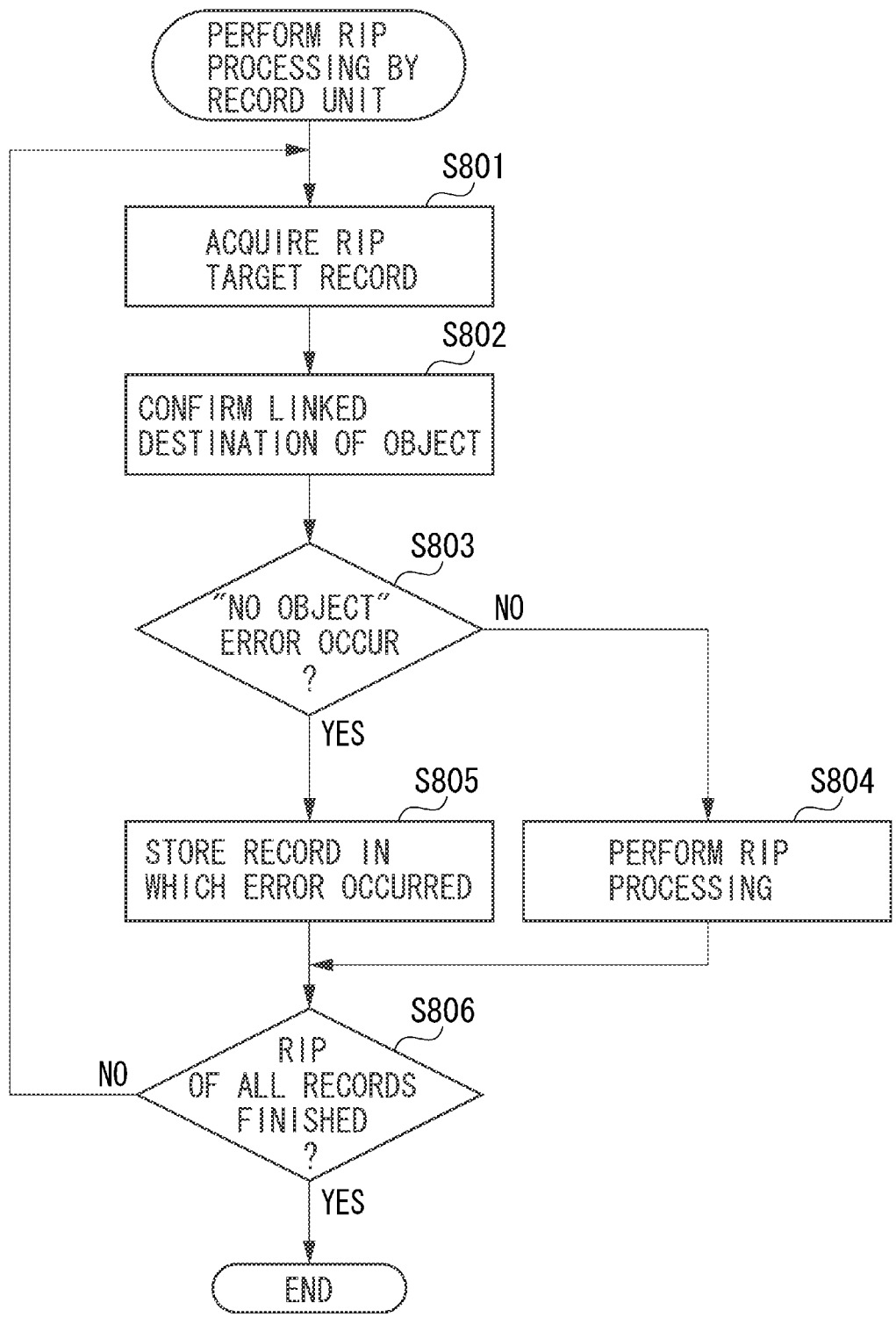
FIG. 8 is a flowchart of record unit RIP processing.

FIG. 8 is a flowchart illustrating in more detail the raster image processing by record unit performed in step S506 of FIG. 5. The processing performed in each step of the flow illustrated in FIG. 8 is executed by the control unit 201 controlling the respective units of the image forming apparatus 10 based on a program stored in the storage unit 213.

In step S801, the RIP unit 208 acquires record information about the next record that will become the target for raster image processing from the analyzed record storage unit 207. In step S802, the RIP unit 208 confirms the link destinations of the VDP object and the master object to be used in output of the record based on the acquired record information.

In step S803, the RIP unit 208 determines whether an error has occurred by detecting errors caused by a link destination object not being present based on the link destination confirmation. If it is determined that an error occurred (YES in step S803), the processing proceeds to step S805. If it is determined that an error did not occur (NO in step S803), the processing proceeds to step S804.

In step S804, the RIP unit 208 generates print data by performing raster image processing on the objects included in the record. In step S805, the RIP unit 208 specifies the suspended record, and interrupts the raster image processing performed on the plurality of pages included in the suspended record.

Next, the RIP unit 208 notifies the suspended record control unit 204 of the suspended record. The suspended record control unit 204 stores the suspended record, for which notification is received, in the suspended record storage unit 203.

In step S806, the RIP unit 208 determines whether raster image processing of all the records included in the VDP job is finished. If it is determined that raster image processing of all the records is finished (YES in step S806), the RIP unit 208 ends the processing flow. If it is determined that raster image processing of all the records is not finished (NO in step S806), the processing returns to step S801, and raster image processing of the next RIP target record starts.

Next, the raster image processing by job unit performed in step S509 of FIG. 5 will be described.

In the raster image processing by job unit, the RIP unit 208 performs raster image processing on all of the pages included in the job. Further, if an error is detected during the raster image processing, the control unit 201 interrupts the whole VDP job, and promotes the next job stocked in the image forming apparatus 10.

Figure 9:
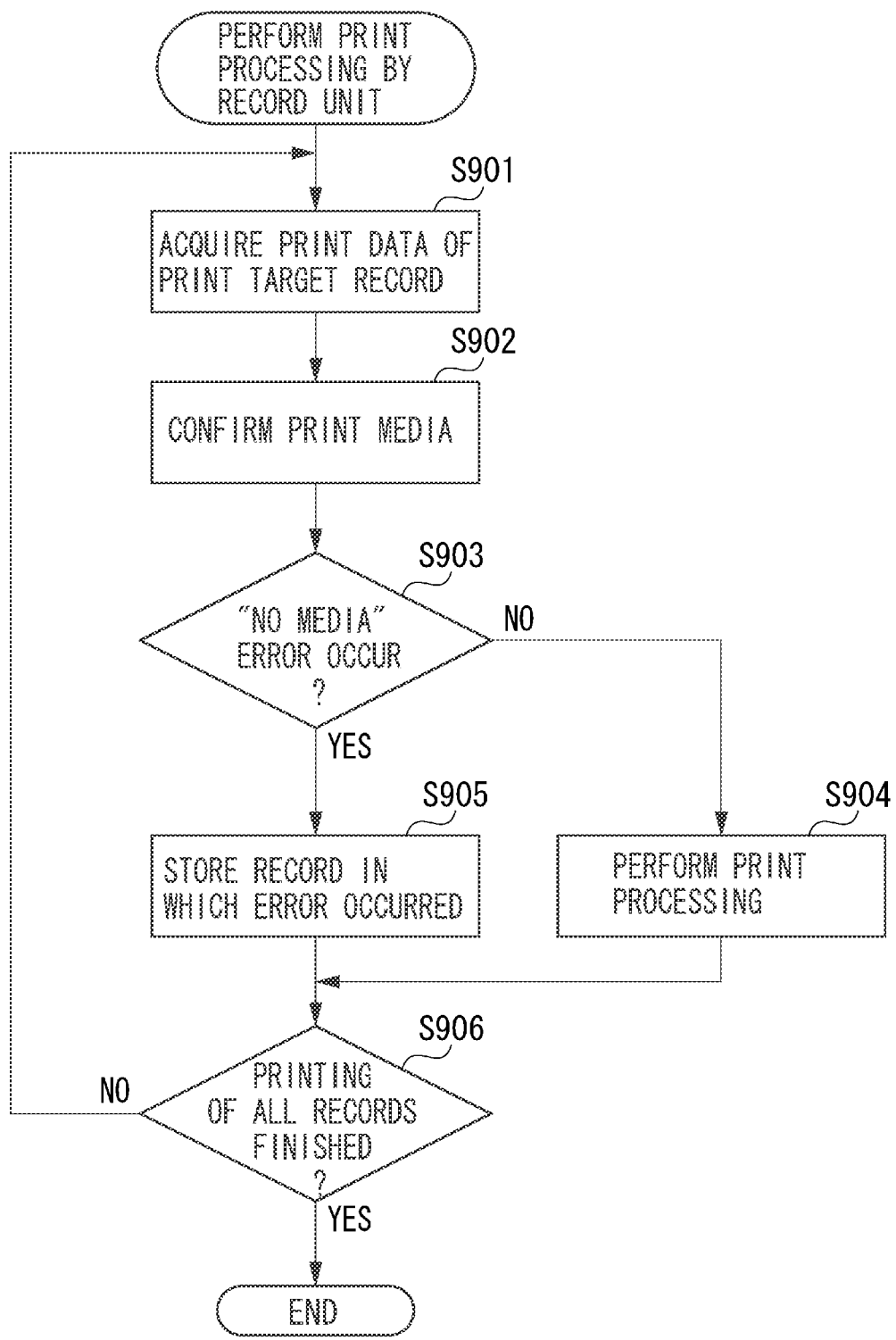
FIG. 9 is a flowchart of record unit print processing.

FIG. 9 is a flowchart illustrating in more detail the print processing by record unit performed in step S507 of FIG. 5. The processing performed in each step of the flow illustrated in FIG. 9 is executed by the control unit 201 controlling the respective units of the image forming apparatus 10 based on a program stored in the storage unit 213.

In step S901, the printing unit 209 acquires print data of the print target record. In step S902, the printing unit 209 confirms whether the media to be used during printing of the print data of the print target record is correctly set in the sheet feed stage.

In step S903, the printing unit 209 determines whether an error has occurred by detecting errors caused by the media not being correctly set in the sheet feed stage based on the confirmation performed in step S209. If it is determined that an error occurred (YES in step S903), the processing proceeds to step S905. If it is determined that an error did not occur (NO in step S903), the processing proceeds to step S904.

In step S904, the printing unit 209 prints the print data of the print target record and discharges the output product. In step S905, the printing unit 209 specifies the suspended record, and interrupts the print processing of the plurality of pages included in the suspended record.

Next, the printing unit 209 notifies the suspended record control unit 204 of the suspended record. The suspended record control unit 204 stores the suspended record, for which notification is received, in the suspended record storage unit 203.

In step S906, the printing unit 209 determines whether print processing of all the records included in the VDP job is finished. If it is determined that print processing of all the records is finished (YES in step S906), the printing unit 209 ends the processing flow. If it is determined that print processing of all the records is not finished (NO in step S906), the processing returns to step S901, and print processing of the next print target record starts.

Next, the print processing by job unit performed in step S510 of FIG. 5 will be described.

In the print processing by job unit, the printing unit 209 performs print processing for all of the pages included in the job. Further, if an error is detected during the print processing, the control unit 201 interrupts the whole VDP job, and promotes the next job stocked in the image forming apparatus 10.

In the present exemplary embodiment, two examples of errors are described, in which an error occurs when an object is not present at the link destination, and an error occurs when the correct media for printing is not set during printing. However, the present invention is not limited to these two types of errors. Obviously, the present invention can be applied for other types of errors as well.

In the present exemplary embodiment, unnecessary printing output can be prevented, and efficient printing of a VDP job can be performed by interrupting (suspending) by record unit during output processing of the VDP job, and restarting (promoting) the output processing from the next record from the interruption.

The expression "interrupting by record unit" means interrupting the output processing of the pages included in the record including page information about the page in which an error is detected. The expression "restarting the output processing from the next record of the interrupted record" means restarting the output processing from the page included in a record following the record including page information about the page in which an error is detected from among the records included in the variable print jobs.

Further, in the present exemplary embodiment, it is determined whether a received job is a VDP job. Output processing by record unit is performed for jobs determined to be a VDP job. For jobs determined not to be a VDP job, output processing by job unit is performed. Consequently, suspension processing suited to the type of job can be performed, and jobs can be printed efficiently.

In a second exemplary embodiment, a message is displayed to notify the operator of a suspended record when a record is suspended due to an error occurring during output processing of a VDP job. Further, along with this notification, the operator is prompted to issue a suspended record restart instruction. Re-output processing is performed in response to the restart instruction from the operator.

The following exemplary embodiments will be described based on the suspension processing performed during the print processing by job unit described above using FIG. 9. However, the following exemplary embodiments are not limited to print processing, and may also be applied to other output processing such as analysis processing and raster image processing. Further, in the following exemplary embodiments, the analysis target record, the RIP target record, and the print target record are collectively referred to as "output target record".

Figure 10:
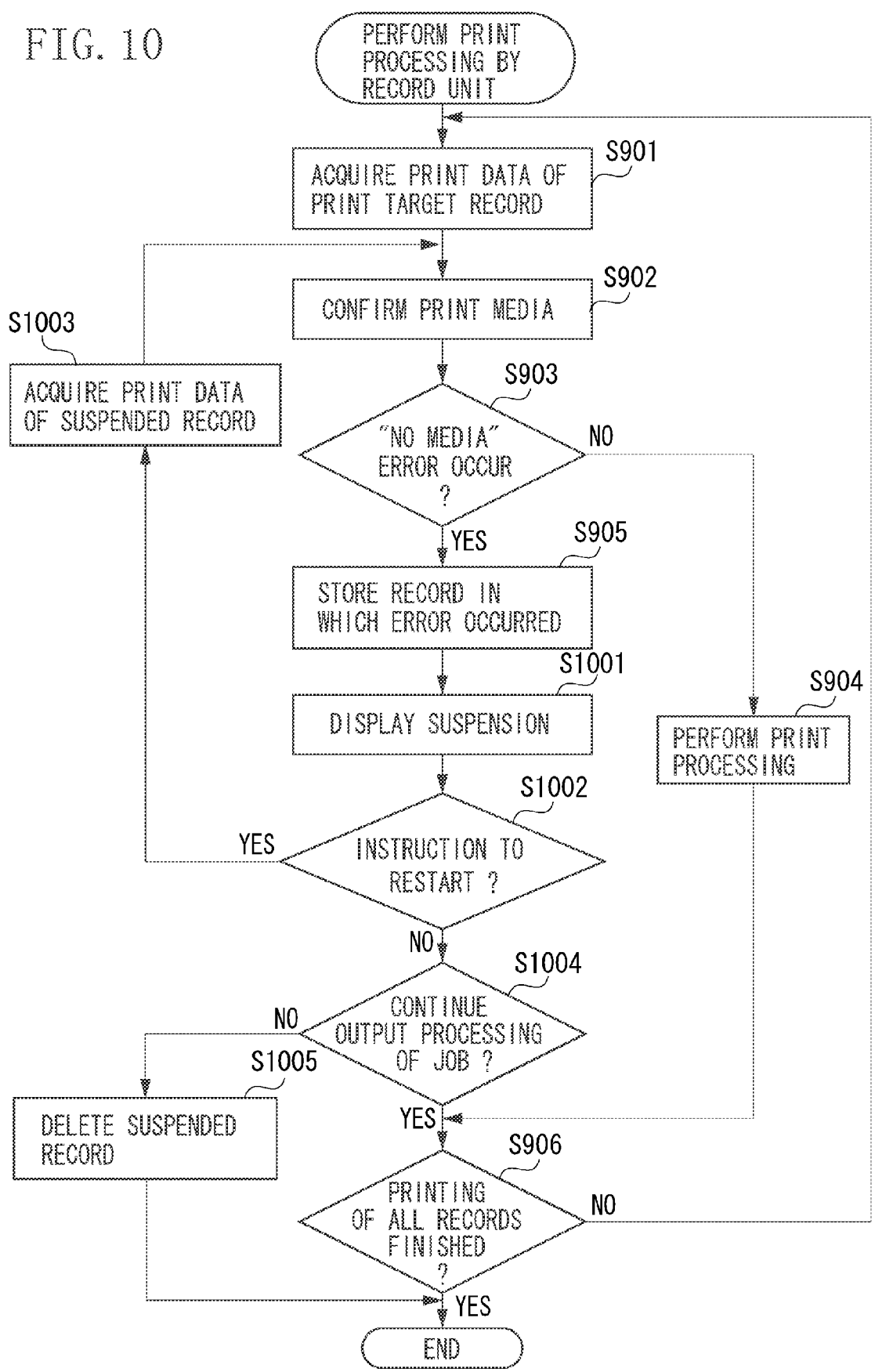
FIG. 10 is a flowchart of restart instruction processing when a suspended record occurs.

FIG. 10 is a flowchart illustrating a processing flow according to the second exemplary embodiment. Since the processing of steps S901 to S906 performed in the present exemplary embodiment is the same as that of the first exemplary embodiment, descriptions thereof will be omitted here. Only the processing of steps S1001 to S1005, which is the difference with the first exemplary embodiment, will be described.

Figure 13:
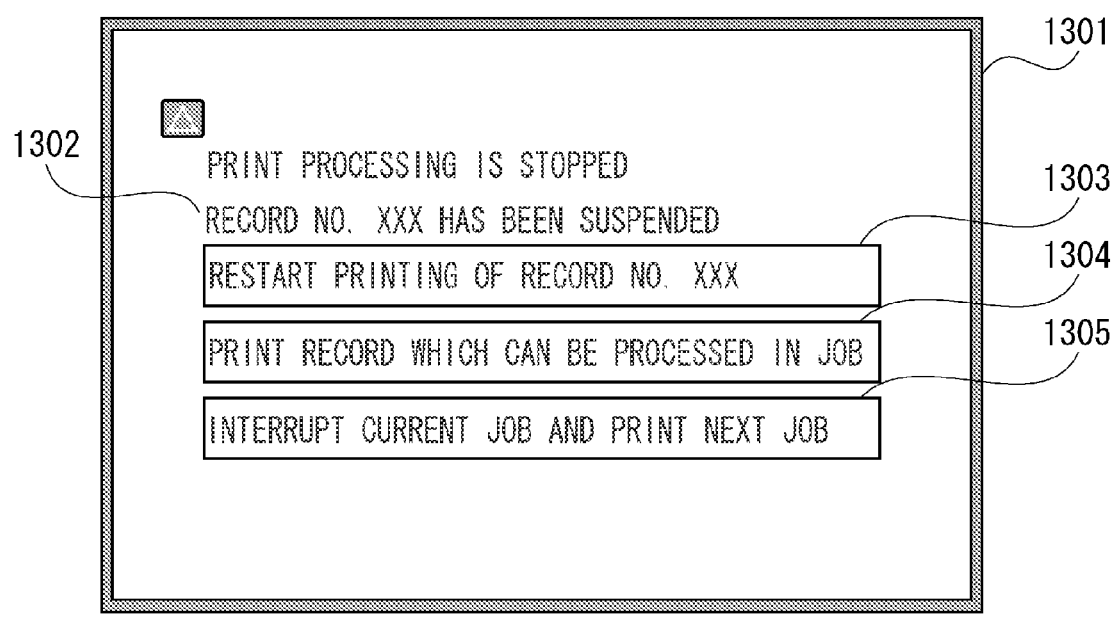
FIG. 13 illustrates an example of a notification screen during suspended record detection.

In step S1001, the display control unit 205 notifies the operator that a record has been suspended during print processing, and that printing has been interrupted by displaying a screen indicating such information on the operation unit 210. At this stage, the display control unit 205 acquires the record ID or the customer number of the suspended record from the suspended record storage unit 203, and displays the acquired information on the operation unit 210. An example of such a message is illustrated in FIG. 13.

In step S1002, the suspended record control unit 204 determines whether an instruction to restart the suspended record is made by the operator via the operation unit 210. If it is determined that a restart instruction is made (YES in step S1002), the suspended record control unit 204 receives the restart instruction, and the processing then proceeds to step S1003. If it is determined that a restart instruction is not made (NO in step S1002), the processing proceeds to step S1004.

In step S1003, the printing unit 209 acquires the print data corresponding to the suspended record stored in the suspended record storage unit 203 in response to the restart instruction, and sets the acquired print data as the reprint target. Then, the processing proceeds to step S902.

In step S1004, the suspended record control unit 204 determines whether an instruction to continue processing corresponding to the VDP job including the suspended record is made by the operator via the operation unit 210. If it is determined that a continuation processing instruction is made (YES in step S1004), the processing proceeds to step S906. If it is determined that a continuation processing instruction is not made (NO in step S1004), the processing proceeds to step S1005.

In step S1005, the suspended record control unit 204 deletes the suspended record stored in the suspended record storage unit 203, and ends the processing. Further, the control unit 201 interrupts the whole VDP job, and promotes the next job stocked in the image forming apparatus 10.

In the present exemplary embodiment, a message is displayed to notify the operator of a suspended record. Along with this notification, the operator is prompted to issue a suspended record restart instruction. Then, re-output processing is performed in response to the restart instruction from the operator who received the prompt. Consequently, the operator can see the notification about the suspended record, and can then start reprinting of the suspended record after resolving the cause of the error.

Figure 11:
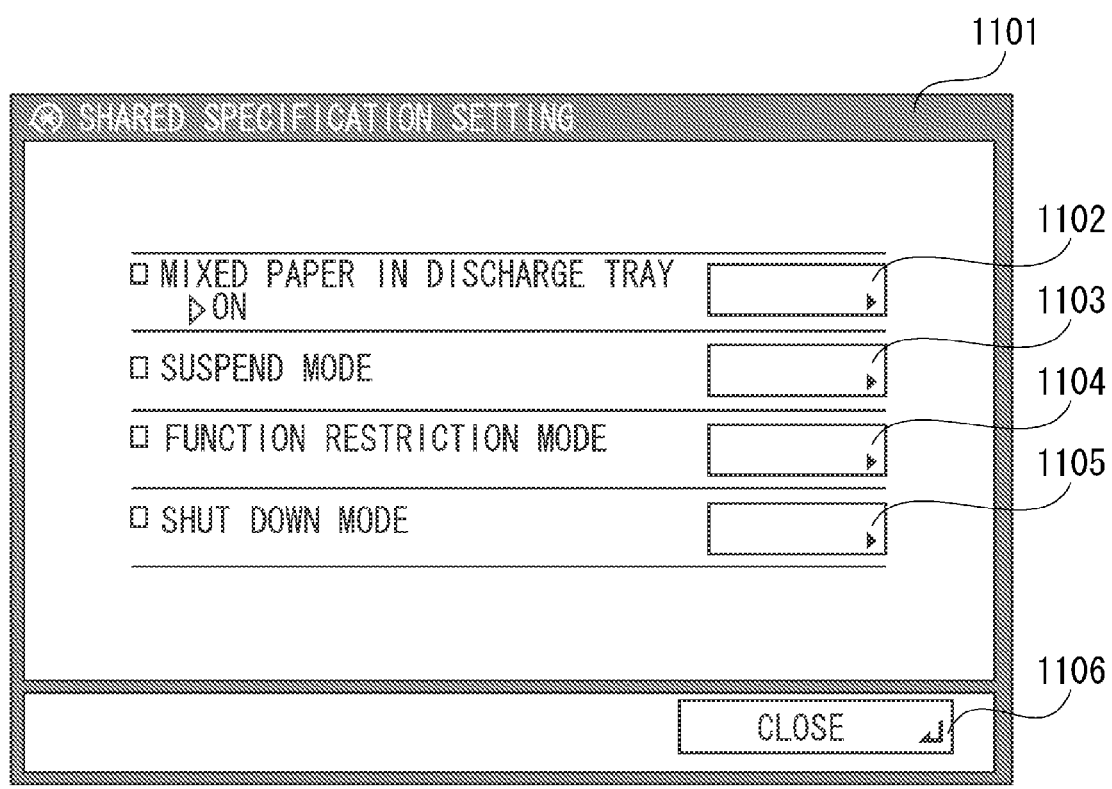
FIG. 11 illustrates an example of a shared specification setting screen of an operation screen in an image forming apparatus.

FIG. 11 illustrates a shared specification setting screen 1101 displayed on the operation unit 210 by the display control unit 205.

This example of the shared specification setting screen 1101 has a mixed paper in discharge tray button 1102, a suspend mode setting button 1103, a function restriction mode button 1104, a shut down mode button 1105, and a close button 1106.

The mixed paper in discharge tray button 1102, the function restriction mode button 1104, and the shut down mode button 1105 are examples of functions which can be set from the shared specification setting screen 1101 that sets the respective functions. Therefore, these buttons have no direct relation on the present invention. The display control unit 205 detects that the close button 1106 is pressed on the operation unit 210, and closes the shared specification setting screen 1101.

Figure 12:
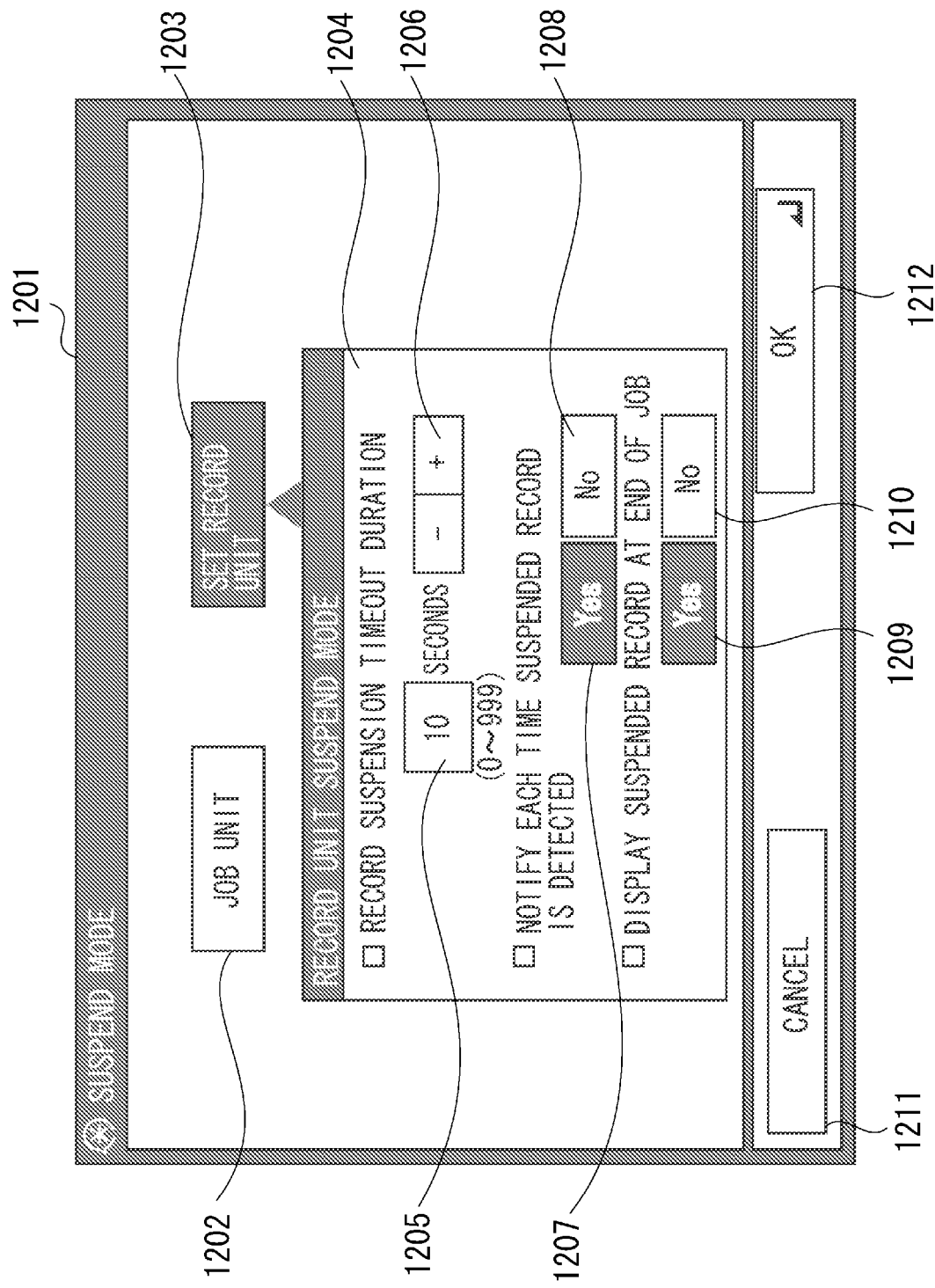
FIG. 12 illustrates an example of a suspend mode screen of an operation screen in an image forming apparatus.

The display control unit 205 detects that the suspend mode setting button 1103 is pressed on the operation unit 210, and displays the suspend mode setting screen illustrated in FIG. 12.

FIG. 12 illustrates a suspend mode setting screen 1201 displayed when the suspend mode setting button 1103 is pressed on the shared specification setting screen 1101. The suspend mode setting screen 1201 includes a job unit button 1202, a record unit button 1203, a cancel button 1211, and an OK button 1212.

The job unit button 1202 is for setting the suspension processing during output processing to be performed by job unit. The record unit button 1203 is for setting the suspension processing during output processing to be performed by record unit. Further, the display control unit 205 detects that the record unit button 1203 is pressed by the operator, and displays a detail-setting screen 1204 for record unit suspension processing.

The detail-setting screen 1204 for record unit suspension processing includes settable items such as a record suspension timeout duration setting and a setting for displaying the suspended record each time a suspended record is detected. In addition, the detail-setting screen 1204 has settable items for collectively displaying suspended records after the output processing of the job is finished.

The operator can change a record suspension timeout duration 1205 with plus/minus buttons 1206. The "record suspension timeout duration" indicates a standby time during suspension until the next record is promoted.

If the operator can resolve the cause of the record being suspended before this timeout occurs, the processing of the suspended record is continued. Further, the operator can select whether or not to be notified of the fact that a record is suspended each time a suspended record is detected with a YES button 1207 or a NO button 1208.

If the YES button 1207 is detected to have been pressed, the setting is set so that the display performed in step S1001 of FIG. 10 is performed. Further, the operator can select whether to display the suspended records at the end of the job with a YES button 1209 or a NO button 1210.

If the YES button 1209 is detected to have been pressed, when the output processing of the printable records included in one VDP job is all finished, information about the records suspended for that job is acquired and displayed in a list. The suspended record display when output processing is finished will be described below in a third exemplary embodiment.

If the display control unit 205 detects that the cancel button 1211 is pressed, the display control unit 205 discards the contents of the settings that are changed by the suspend mode setting screen 1201 and the detail-setting screen 1204 of record unit suspension processing, and closes the suspend mode setting screen 1201.

If the display control unit 205 detects that the OK button 1212 is pressed, the display control unit 205 notifies the suspended record control unit 204 of the contents of the settings changed by the suspend mode setting screen 1201 and the detail-setting screen 1204 of record unit suspension processing. Further, after the notification is finished, the display control unit 205 closes the suspend mode setting screen 1201. The suspended record control unit 204 sets the suspension processing based on the notified setting contents.

FIG. 13 illustrates a display example of a suspended record in step S1001 of FIG. 10.

A display screen 1301 has a restart instruction button 1303 for restarting printing of the suspended record, a button 1304 for printing processable records in the job, and a button 1305 for interrupting the current job and printing the next job.

The display control unit 205 displays in a message 1302 that the print processing for record No. XXX has been interrupted for some reason, and that the record is suspended. This "record No. XXX" is a record ID.

This message 1302 is not limited to the record ID. Any information included in the database of FIG. 3 may be displayed. For example, by displaying the customer number or name corresponding to the suspended record, the operator can be notified of the record in which an error occurred in an easy to understand manner.

If the display control unit 205 detects that the restart instruction button 1303 for the suspended record is pressed, the display control unit 205 notifies the suspended record control unit 204 that the suspended record is a reprint target. When this notification is made, in step S1002 of FIG. 10, the suspended record control unit 204 determines that an instruction to restart the suspended record is made by the operator via the operation unit 210 (YES in step S1002).

When a suspension error occurs, it is assumed that the operator will press the restart instruction button 1303 after specifying and resolving the cause of the suspension error. For example, when a record is suspended because the media for printing is not set in the sheet feed stage, printing is efficiently continued by pressing the restart instruction button 1303 after the operator has reset the paper in the sheet feed stage.

If the display control unit 205 detects that the button 1304 for printing processable records in the job is pressed, the display control unit 205 notifies the suspended record control unit 204 that there is an instruction to continue output of the next record. When this notification is made, in step S1004 of FIG. 10, the suspended record control unit 204 determines that an instruction to continue processing of the VDP job including the suspended record is made by the operator via the operation unit 210 (YES in step S1004).

If the operator presses this button when the cause of the suspended record can not be immediately specified and resolved, a request to promote the next record is issued, and printing is continued. Thus, by enabling the next record to be promoted by record unit when an error occurs, printing can be efficiently continued without interrupting the printing of the whole VDP job.

If the display control unit 205 cancels a job that includes a suspended record during printing, and detects that the button 1305 for promoting the next job is pressed, the display control unit 205 notifies the suspended record control unit 204 of the job cancellation instruction.

When this notification is made, in step S1004 of FIG. 10, the suspended record control unit 204 determines that an instruction to continue processing of the VDP job including the suspended record is not made by the operator via the operation unit 210 (NO in step S1004). When an error occurs in the whole record, by pressing the button 1305, the whole VDP job is cancelled, and the next job is promoted. Consequently, the output processing can be efficiently performed.

In a third exemplary embodiment, a message is displayed to notify the operator of a record suspension, which occurred during output processing of a VDP job after all of the output processing for all of the records included in the VDP job is finished. Further, along with this notification, the operator is prompted to issue a suspended record restart instruction. Re-output processing is performed in response to the restart instruction from the operator.

Figure 14A:
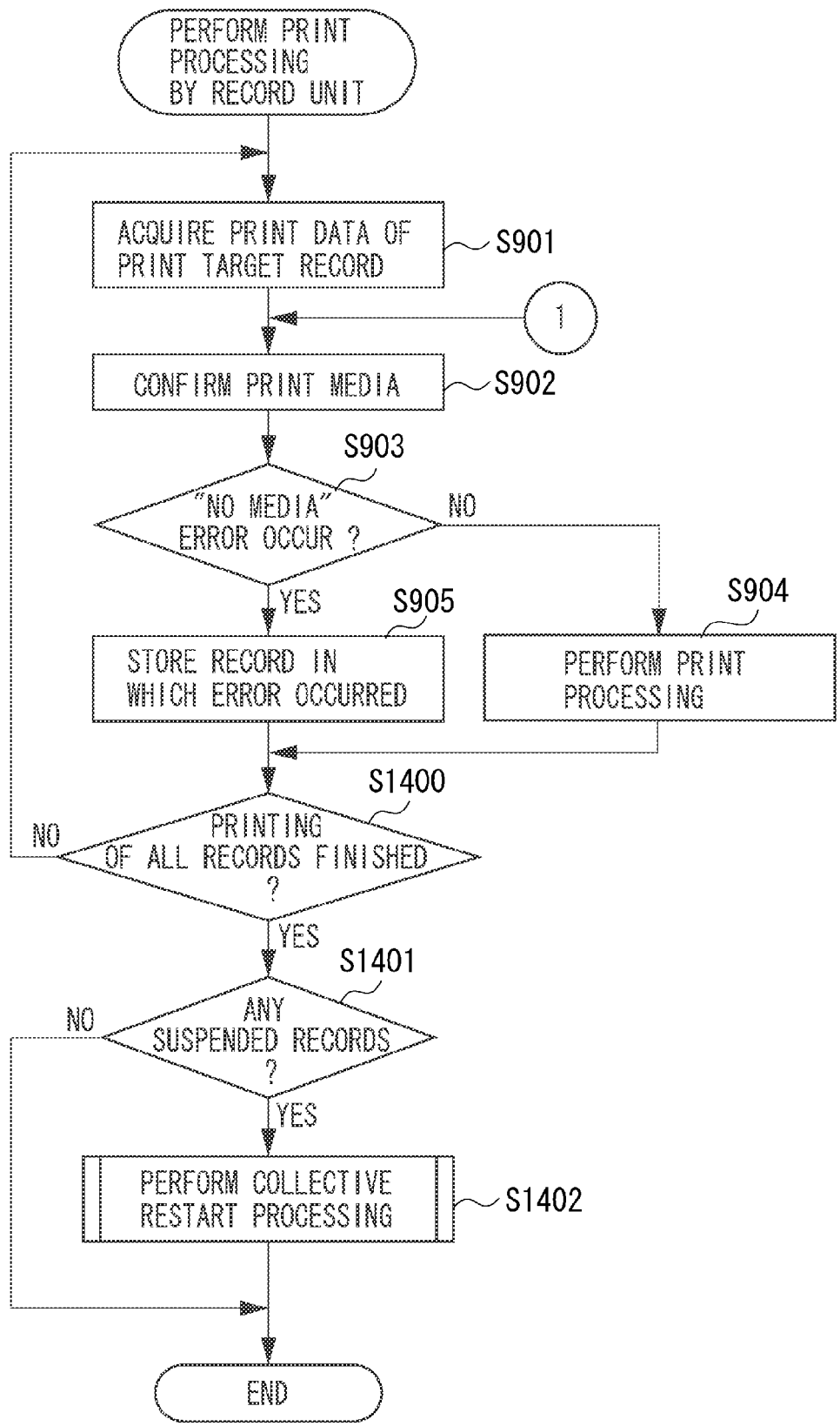
FIG. 14A is a flowchart of processing for selecting an instruction to restart a suspended record collectively by VDP job.

FIG. 14A is a flowchart illustrating a processing flow according to the third exemplary embodiment. Since the processing of steps S901 to S905 performed in the present exemplary embodiment is the same as that of the first exemplary embodiment, descriptions thereof will be omitted here. Only the processing of steps S1400 to S1402, which is the difference with the first exemplary embodiment, will be described.

In step S1400, the printing unit 209 determines whether print processing of all the records included in the VDP job is finished. If it is determined that print processing of all the records is finished (YES in step S1400), the processing proceeds to step S1401. If it is determined that print processing of all the records is not finished (NO in step S1400), the processing returns to step S901, and print processing of the next output target record starts.

In step S1401, the suspended record control unit 204 determines whether a suspended record is stored in the suspended record storage unit 203. If it is determined that a suspended record is stored (YES in step S1401), the processing proceeds to step S1402. If it is determined that a suspended record is not stored (NO in step S1401), the suspended record control unit 204 ends the output processing of the VDP job, and promotes the next job.

In step S1402, information about the suspended records occurred in the VDP job is collectively informed to the operator. Further, reprinting is performed in response to an instruction from the operator, and collective restart processing is executed.

Figure 14B:
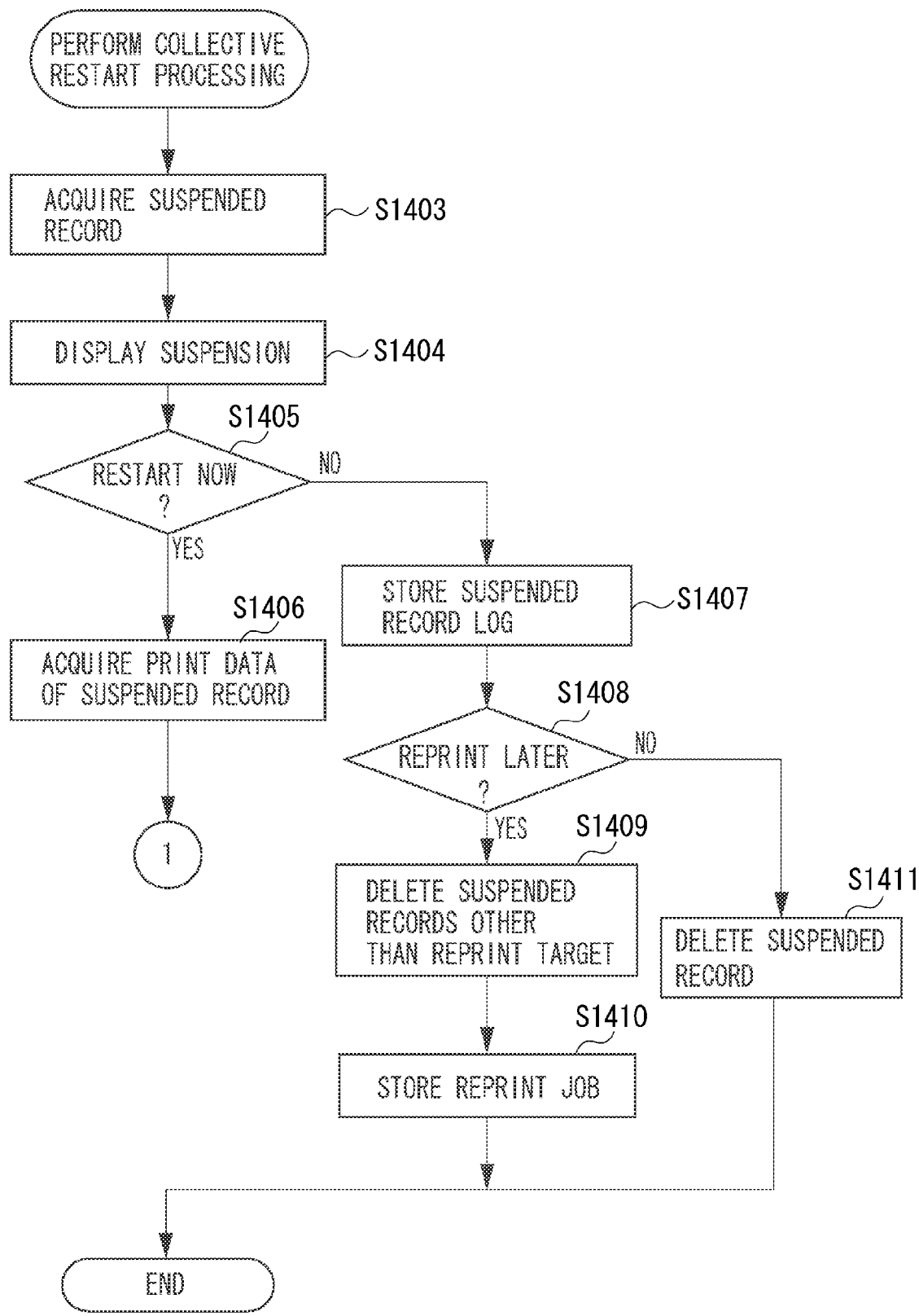
FIG. 14B is a flowchart of collective restart processing.

FIG. 14B is a flowchart illustrating in more detail the collective restart processing performed in step S1402. In step S1403, the suspended record control unit 204 acquires the suspended records stored in the suspended record storage unit 203.

Figure 16:
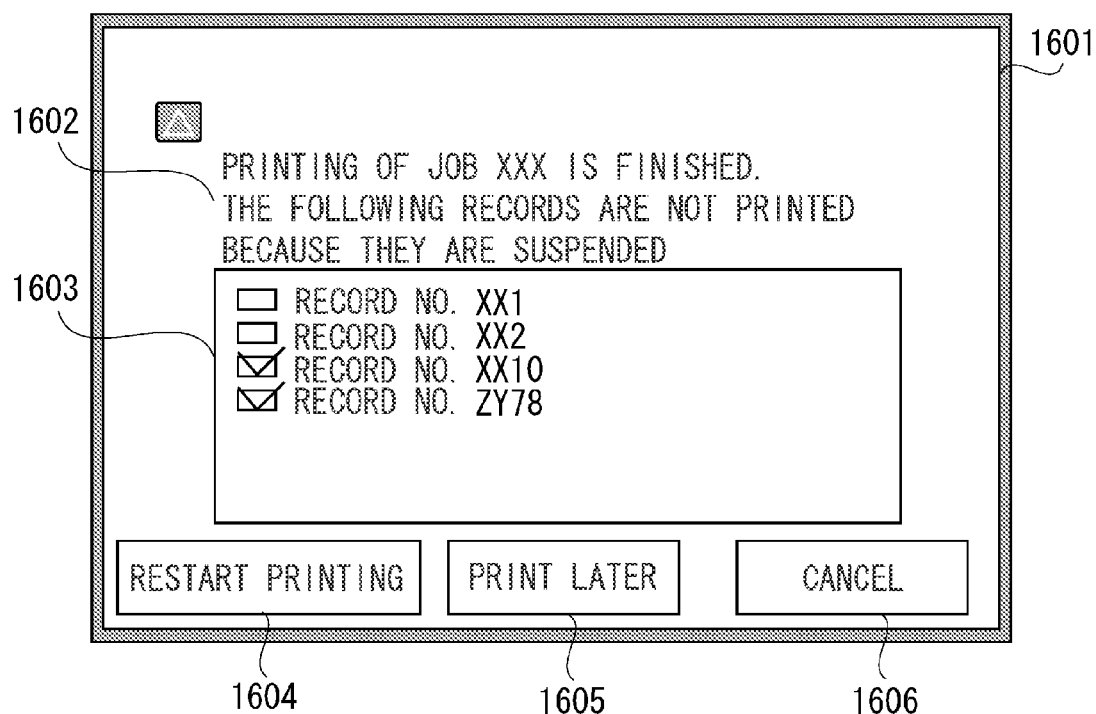
FIG. 16 illustrates an example of a notification screen for notifying a collective restart instruction.

In step S1404, the display control unit 205 displays the acquired suspended records on the operation unit 210, and collectively notifies the operator of the information about the suspended records occurred in the VDP job. An example of the screen displayed at this stage is illustrated in FIG. 16. In the present exemplary embodiment, the display control unit 205 acquires the ID or customer number held in each record from the suspended record storage unit 203, and displays the acquired information.

In step S1405, the suspended record control unit 204 determines whether an instruction to immediately restart the suspended record is made by the operator via the operation unit 210. If it is determined that an instruction to immediately restart the suspended record is made (YES in step S1405), the suspended record control unit 204 receives the instruction, and the processing proceeds to step S1406.

However, if it is determined that an instruction to immediately restart the suspended record is not made (NO in step S1405), the processing proceeds to step S1407.

In step S1406, in response to the instruction to immediately restart the suspended record, the suspended record control unit 204 acquires the print data of the suspended record for which the instruction is made based on information in the suspended record storage unit 203. Then, the processing proceeds to step S902 of FIG. 14A.

In step S1407, the suspended record control unit 204 stores information about the suspended record as a log in the storage unit 213. Examples of the information kept as a log include the reason why the error has occurred, the job ID, the record ID, the output processing date and time, and the like. Thus, by storing a log of the suspended record, the operator can perform analysis such as why the error has occurred.

In step S1408, the suspended record control unit 204 determines whether an instruction to reprint the suspended record later is made by the operator via the operation unit 210. If it is determined that an instruction to reprint the suspended record later is made (YES in step S1408), the processing proceeds to step S1409. On the other hand, if it is determined that an instruction to reprint the suspended record later is not made (NO in step S1408), the processing proceeds to step S1411.

In step S1409, of the suspended records included in the VDP job that is currently undergoing output processing, the suspended record control unit 204 deletes the suspended records other than the suspended record for which an instruction to reprint the suspended record later is made. More specifically, the suspended record control unit 204 acquires the record ID of the suspended record for which an instruction to reprint the suspended record later is made from the display control unit 205.

Further, of the suspended records stored in the suspended record storage unit 203, the suspended record control unit 204 deletes the suspended records included in the VDP job currently undergoing output processing, and which have a record ID other than the acquired record ID.

In step S1410, the suspended record control unit 204 generates a reprint job of the suspended record for which an instruction to reprint later is made, and stores the generated reprint job in the suspended record storage unit 203. The generated reprint job is provided with the same job ID as the VDP job including the suspended record of the reprint target.

Further, the reprint job is subjected to output processing by the operator performing an execution instruction on the operation unit 210. This reprint job output processing will be described below using FIG. 15. In addition, if the reusable object to be used in the reprint job is present, to improve the efficiency of the output processing during reprinting, the reusable object is keep without deleting it.

The reprint job is not limited to being stored in the image forming apparatus 10. For example, the reprint job may be sent to the client PC 40 or the print server 20, and the job execution instruction may be made at the sent destination. By thus enabling just the suspended record to be reprinted as a separate job, reprinting of an already printed record can be prevented, an unnecessary output product can be prevented from being output, and the time for reprinting a printed record can be saved.

In step S1411, of the suspended records stored in the suspended record storage unit 203, the suspended record control unit 204 deletes all of the suspended records included in the VDP job currently undergoing output processing, and ends the processing.

In the present exemplary embodiment, a message is displayed for collectively notifying the operator of a suspended record after the output processing of all of the records included in the VDP job is finished. Consequently, even if an error occurs midway through the job, the next record is output, so that more efficient output processing is performed. Further, the operator can collectively confirm the suspended records after the job is finished.

Still further, in the present exemplary embodiment, along with the notification, the operator is prompted to issue a suspended record restart instruction, and the re-output processing is performed in response to the restart instruction from the operator. Consequently, the operator can reprint records, which are suspended and not printed at a timing based on the cause of the error.

Figure 15:
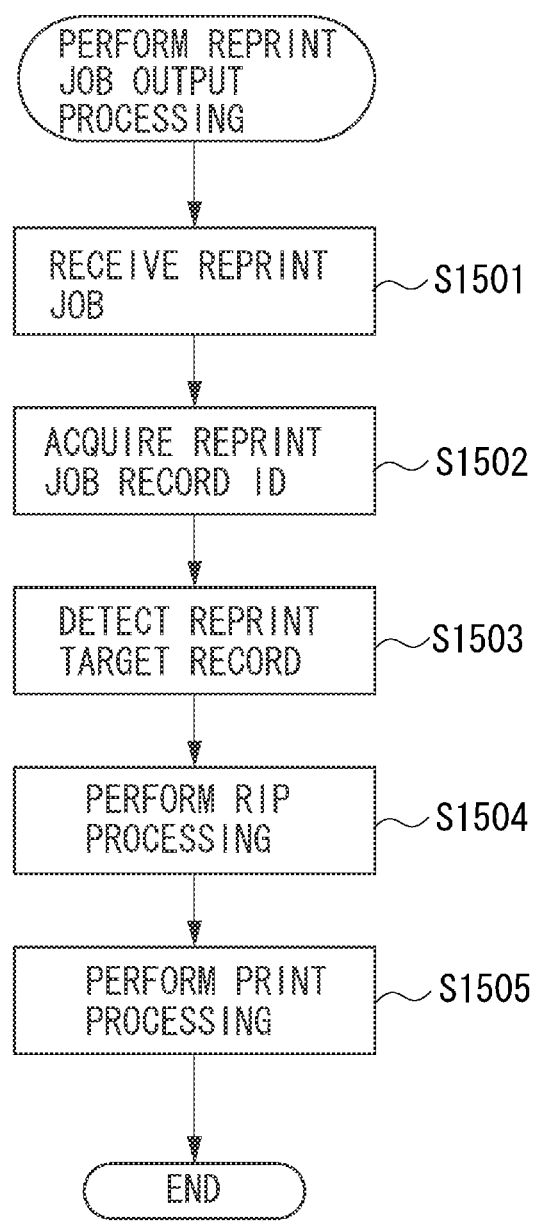
FIG. 15 is a flowchart of reprinting a VDP job.

FIG. 15 is a flowchart illustrating a flow of output processing for a reprint job. In step S1501, the VDP job reception unit 202 receives an instruction to execute a reprint job input by the operator via the operation unit 210. This instruction to execute the reprint job is not limited to being issued from the operation unit 210 of the image forming apparatus 10. It can also be issued from the print server 20 or the client PC 40.

In step S1502, the VDP job analysis unit 206 analyzes the reprint job, and acquires the job ID of the reprint job. In step S1503, the suspended record control unit 204 detects all of the suspended records having the acquired job ID from among the suspended records stored in the suspended record storage unit 203. Then, the detected records are transferred to the RIP unit 208.

In step S1504, the RIP unit 208 generates print data by performing raster image processing of the objects included in the records. At this stage, if an object that has already undergone raster image processing is stored in the RIP unit 208, that object is reused as print data without re-performing raster image processing on it. In step S1505, the printing unit 209 prints the print data of the output target record and discharges the output product.

Thus, by performing processing of the reprint job based on record information stored in the suspended record storage unit 203, output processing can be executed more efficiently than for a new job.

FIG. 16 illustrates a display example of the suspended record in step S1404 of FIG. 14B. A display screen 1601 includes an error message 1602, a suspended record list 1603, a button 1604 for restarting printing, a reprint later button 1605, and a cancel button 1606. The error message 1602 displays a message notifying the operator that printing for all of the printable records in the VDP job is finished, and that a suspended record is detected.

The suspended record list 1603 displays a list of the suspended records. In FIG. 16, although a list of record IDs is displayed, this list may also display the information included in the database of FIG. 3.

The operator can select the record for restarting output processing or the record for generating the reprint job to be reprinted later by checking a check box in the suspended record list 1603.

If the display control unit 205 detects that the button 1604 for restarting printing is pressed, the display control unit 205 notifies the suspended record control unit 204 of the record ID of the record selected in the suspended record list 1603. Then, the suspended record control unit 204 restarts output processing of the record corresponding to the notified record ID.

If the button 1604 for restarting printing is pressed, in step S1405 of FIG. 14B, it is determined that an instruction to immediately restart the suspended record is made (YES in step S1405).

If the display control unit 205 detects that the reprint later button 1605 is pressed, the display control unit 205 notifies the suspended record control unit 204 of the record ID of the record selected in the suspended record list 1603. Here, if a reprint later button 1605 is pressed, in step S1408 of FIG. 14B, it is determined that an instruction to reprint later is made (YES in step S1408).

If the display control unit 205 detects that the cancel button 1606 is pressed, the display control unit 205 notifies the suspended record control unit 204 of the instruction to end the job. Here, if the cancel button 1606 is pressed, in step S1408 of FIG. 14B, it is determined that an instruction to reprint later is not made (NO in step S1408).

Thus, by collectively displaying the suspended records immediately before printing is finished, the operator can confirm the number of suspended records, and suspended records. Further, by enabling the operator to make a restart instruction for a plurality of suspended records immediately before the job is finished, the number of records that, for some reason, cannot be printed can be minimized.

Figure 17:
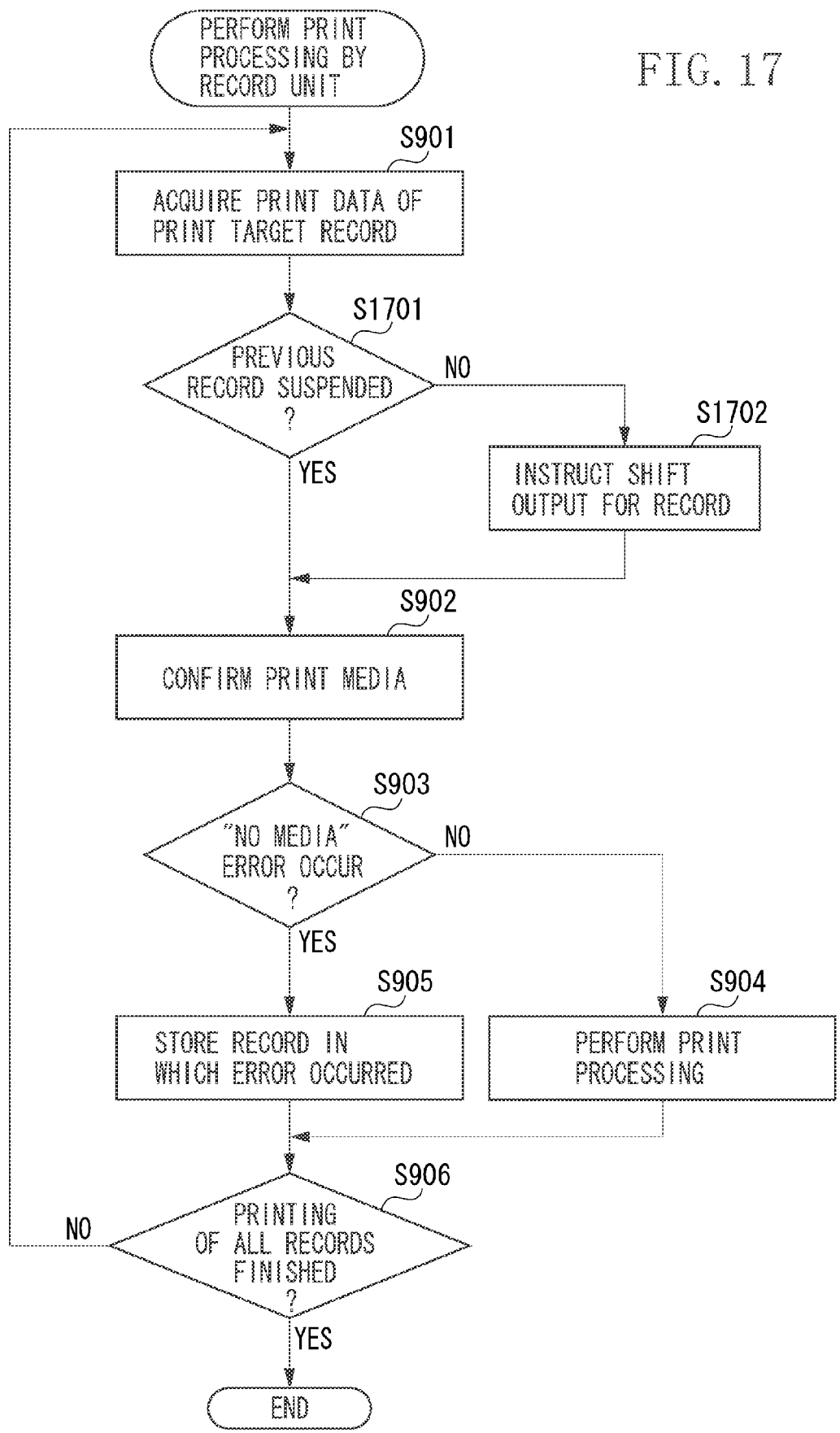
FIG. 17 is a flowchart of shift and discharge processing performed when a suspended record occurs.

In a fourth exemplary embodiment, when a suspended record occurs, output of the record following the suspended record is shifted and output. FIG. 17 is a flowchart illustrating a processing flow according to the fourth exemplary embodiment. Since the processing of steps S901 to S906 performed in the present exemplary embodiment is the same as that of the first exemplary embodiment, descriptions thereof will be omitted here. Only the processing of steps S1701 and S1702, which is the difference from the first exemplary embodiment, will be described.

In step S1701, the printing unit 209 determines whether the record one before the record (target record) currently undergoing print processing is a suspended record. If it is determined that the previous record is a suspended record (YES in step S1701), the processing proceeds to step S1702. If it is determined that the previous record is not a suspended record (NO in step S1701), the processing returns to step S902.

At this stage, the printing unit 209 determines whether the record one before the target record is stored in the suspended record storage unit 203 based on the record ID. If it is determined that the record having the record ID (i−1) one before the record ID (i) of the target record is stored in the suspended record storage unit 203, the printing unit 209 determines that this previous record is a suspended record.

In step S1702, the printing unit 209 adds a shift and discharge instruction to the target record. This added shift and discharge instruction is applied in the print processing performed in step S906, so that shift and discharge is executed on the output product.

In the present exemplary embodiment, the operator can also easily specify the locations where the suspended records has occurred based on the stacked output products by shifting and outputting the next record after the suspended record.

The method for specifying the suspended record from among the output products is not limited to shifting and outputting. Examples of other methods that can be executed include outputting an insertion sheet (color paper) at the position where the suspended record occurs, and outputting an insertion sheet having a different discharge orientation from that of the normal output products.

Figure 18:
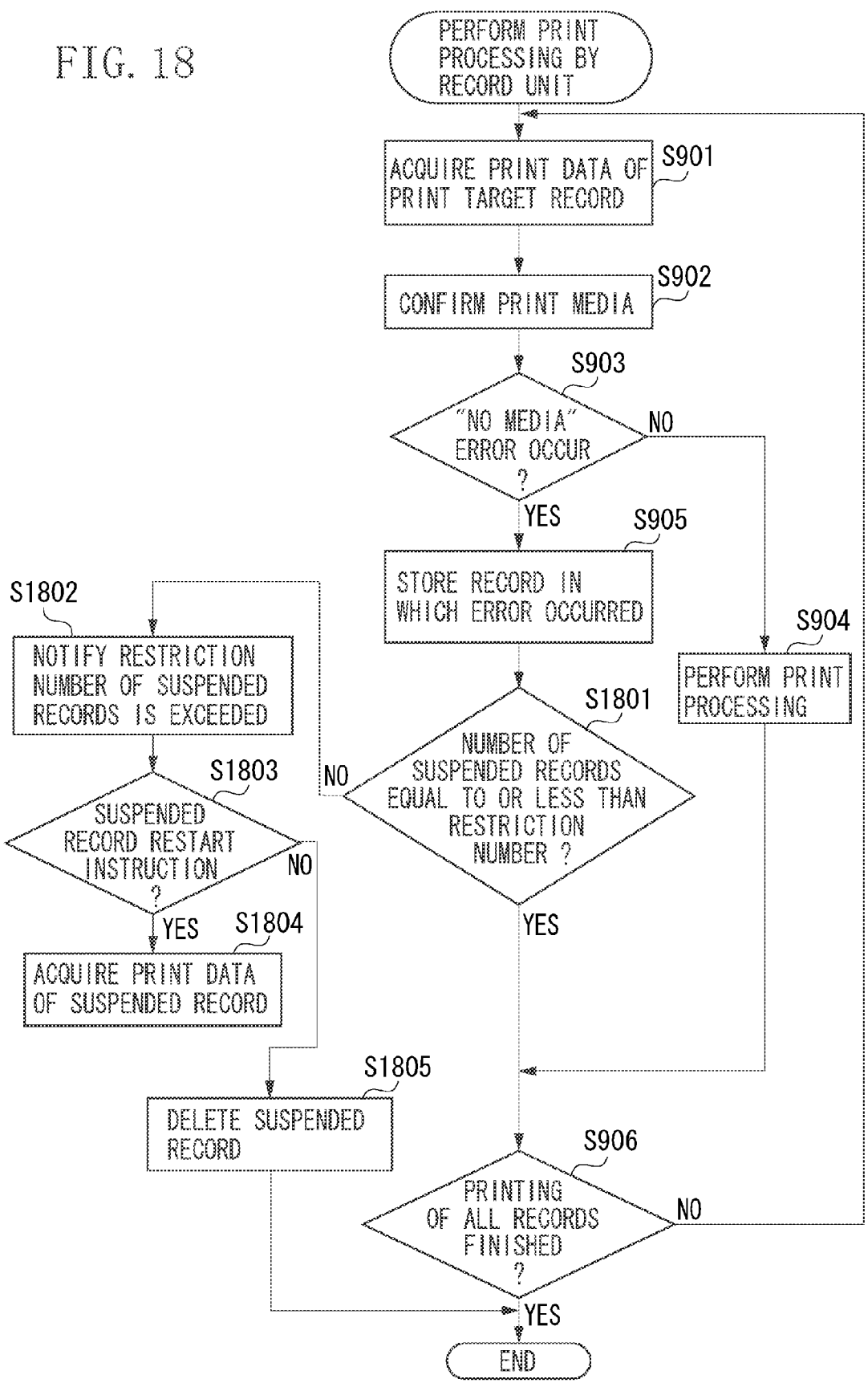
FIG. 18 is a flowchart of processing in which a restriction value is provided for a storage record number of suspended records.

In a fifth exemplary embodiment, a restriction value is set for the number of suspended records in one VDP job. If the restriction is exceeded, the job is cancelled, and the next job is promoted. FIG. 18 is a flowchart illustrating a processing flow according to the fifth exemplary embodiment. Since the processing of steps S901 to S906 performed in the present exemplary embodiment is the same as that of the first exemplary embodiment, descriptions thereof will be omitted here. Only the processing of steps S1801 to S1805, which is the difference from the first exemplary embodiment, will be described.

In step S1801, the suspended record control unit 204 determines whether the number of suspended records stored in the suspended record storage unit 203 is equal to or less than the restriction value. If it is determined that the number of suspended records is equal to or less than the restriction value (YES in step S1801), the processing proceeds to step S906. If it is determined that the number of suspended records is not equal to or less than the restriction value (NO in step S1801), the processing proceeds to step S1802.

Figure 19:
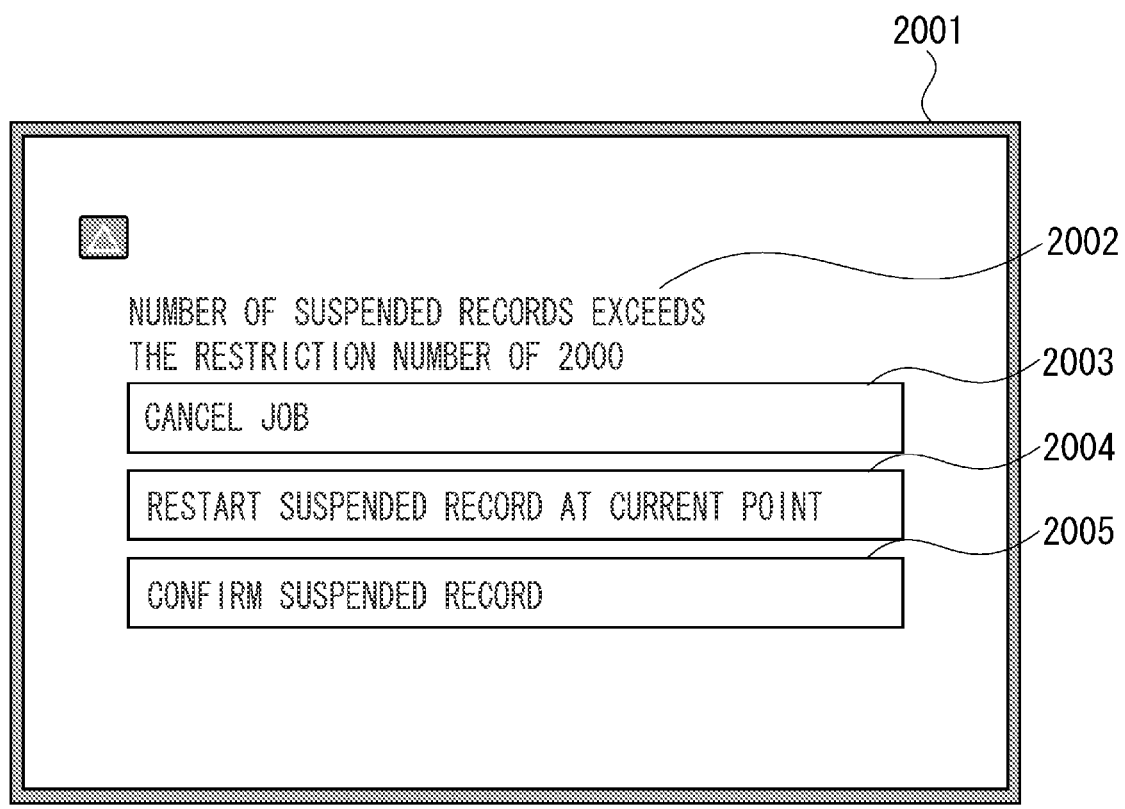
FIG. 19 illustrates an example of a notification screen displayed when the number of stored suspended records exceeds the restriction value.

In step S1802, the display control unit 205 notifies the operator of a message stating that the number of suspended records exceeds the restriction value. An example of the screen displayed at this stage is illustrated in FIG. 19.

In step S1803, the suspended record control unit 204 determines whether an instruction to restart a suspended record stored in the suspended record storage unit 203 is made. If it is determined that there is a restart instruction (YES in step S1803), the processing proceeds to step S1804. If it is determined that there is no restart instruction (NO in step S1803), the processing proceeds to step S1805.

In step S1804, the suspended record control unit 204 acquires the print data corresponding to the suspended record stored in the suspended record storage unit 203.

In step S1805, the suspended record control unit 204 deletes the suspended record stored in the suspended record storage unit 203, then cancels the VDP job currently undergoing output processing, and ends the output processing.

In many cases, VDP jobs include several tens of thousands of records, and in some cases there can be a large number of suspended records. In such cases, setting a restriction on the number of records that can be suspended prevents a storage area from reaching its upper limit.

Further, for a job in which many suspended records occur, there is a high likelihood that a basic cause of the error exists. By canceling such a job in which errors frequently occur, and promoting the next job, efficient output processing can be performed.

FIG. 19 illustrates an example of a screen displayed in step S1802 when the number of stored suspended record exceeds the restriction value. A display screen 2001 includes an error message 2002, a cancel button 2003, a suspended record restart instruction button 2004, and a suspended record confirmation button 2005.

The error message 2002 displays a message for notifying the operator that the number of suspended records has exceeded the restriction value (e.g., 2,000).

If the display control unit 205 detects that the cancel button 2003 is pressed, the display control unit 205 notifies the suspended record control unit 204 that an instruction to end the job is made. If the cancel button 2003 is pressed, in step S1803 of FIG. 18, it is determined that there is no instruction to restart the suspended record (NO in step S1803).

If the display control unit 205 detects that the suspended record restart instruction button 2004 is pressed, the display control unit 205 issues an instruction to restart the suspended record to the suspended record control unit 204. If the suspended record restart instruction button 2004 is pressed, in step S1803 of FIG. 18, it is determined that there is an instruction to restart the suspended record (YES in step S1803).

If the display control unit 205 detects that the suspended record confirmation button 2005 is pressed, a list of the suspended records stored in the suspended record storage unit 203 is displayed in the operation unit 210.

Although exemplary embodiments according to the present invention are described above using specific examples, the present invention is not limited to the above-described exemplary embodiment. Further, the present invention can also be realized by supplying software (a program) for realizing the functions of the above exemplary embodiments to a system or an apparatus via a network or via various storage media, and having a computer (or a central processing unit (CPU) or a micro processing unit (MPU)) of the system or apparatus read and execute the program. In this case, this program and the recording medium on which the program is recorded constitute the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-160757 filed Jul. 7, 2009, which is hereby incorporated by reference herein in its entirety.

What is claimed is:

1. An apparatus for receiving a variable print job having a plurality of records each including page information of a plurality of pages, and based on the page information, outputting an output product including a master object and a variable object, the apparatus comprising:
    a first reception unit configured to receive a print job;
    an output unit configured to execute output processing for outputting the received print job as the output product;
    a detection unit configured to detect an error occurring during execution of the output processing; and
    a control unit configured to, when the print job in which the error is detected is the variable print job, interrupt the output processing of the page included in the record which includes page information of the page in which the error is detected, and of the records included in the variable print job, restart output processing from a page included in a record following the record which includes the page information of the page in which the error is detected,
    wherein the control unit is configured to, when the record one before an output target record is an interrupted record, shift and discharge a page included in the output target record to the output unit.

2. The apparatus according to claim 1, wherein when the print job is not the variable print job, interrupt the print job in which the error is detected, and restart output processing from a print job following that print job.

3. The apparatus according to claim 1, further comprising:
    a storage unit configured to store information about the interrupted record; and
    a notification unit configured to notify a user of the stored information.

4. The apparatus according to claim 1, wherein the notification unit is configured to notify the user of the information concerning the interrupted record based on a fact that the output processing of the page included in the record is interrupted.

5. The apparatus according to claim 1, wherein the notification unit is configured to notify the user of the information concerning the interrupted record in the variable job based on a fact that the output processing of the variable jobs other than the interrupted job is finished.

6. The apparatus according to claim 1, further comprising a second reception unit configured to receive from an instruction to restart the interrupted record, wherein
    the control unit is configured to control the output unit to perform output processing of the page included in the interrupted record in response to the restart instruction.

7. The apparatus according to claim 1, further comprising a generation unit configured to generate a reprint job for reprinting the interrupted record.

8. The apparatus according to claim 1, wherein the output processing includes at least one of analysis processing for associating the master object and the variable object based on the page information, raster image processing for generating print data, and print processing for printing print data on recording paper.

9. The apparatus according to claim 1, further comprising a generation unit configured to generate a reprint job for reprinting the interrupted record.

10. An apparatus for receiving a variable print job having a plurality of records each including page information of a plurality of pages, and based on the page information, outputting an output product including a master object and a variable object, the apparatus comprising:
    a first reception unit configured to receive a print job;
    an output unit configured to execute output processing for outputting the received print job as the output product;

a detection unit configured to detect an error occurring during execution of the output processing;

a control unit configured to, when the print job in which the error is detected is the variable print job, interrupt the output processing of the page included in the record which includes page information of the page in which the error is detected, and of the records included in the variable print job, restart output processing from a page included in a record following the record which includes the page information of the page in which the error is detected;

a storage unit configured to store information about the interrupted record; and a notification unit configured to notify a user of the stored information, wherein the control unit is configured to, when a number of interrupted records exceeds a restriction value, interrupt the variable print job, and restart output printing from a print job following the variable print job.

11. The apparatus according to claim 10, wherein when the print job is not the variable print job, interrupt the print job in which the error is detected, and restart output processing from a print job following that print job.

12. The apparatus according to claim 10, wherein the notification unit is configured to notify the user of the information concerning the interrupted record based on a fact that the output processing of the page included in the record is interrupted.

13. The apparatus according to claim 10, wherein the notification unit is configured to notify the user of the information concerning the interrupted record in the variable job based on a fact that the output processing of the variable jobs other than the interrupted job is finished.

14. The apparatus according to claim 10, further comprising a second reception unit configured to receive from an instruction to restart the interrupted record, wherein the control unit is configured to control the output unit to perform output processing of the page included in the interrupted record in response to the restart instruction.

15. The apparatus according to claim 10, wherein the output processing includes at least one of analysis processing for associating the master object and the variable object based on the page information, raster image processing for generating print data, and print processing for printing print data on recording paper.

16. A method for controlling an apparatus for receiving a variable print job having a plurality of records each including page information of a plurality of pages, and based on the page information, outputting an output product including a master object and a variable object, the method comprising:

receiving a print job;

executing output processing for outputting the received print job as the output product;

detecting an error occurring during execution of the output processing; and interrupting, when the print job in which the error is detected is the variable print job, the output processing of the page included in the record including page information of the page in which the error is detected, and of the records included in the variable print job, restarting output processing from a page included in a record following the record including the page information of the page in which the error is detected, wherein the control unit is configured to, when a number of interrupted records exceeds a restriction value, interrupt the variable print job, and restart output printing from a print job following the variable print job.

17. A non-transitory computer readable storage medium storing computer-executable instructions for controlling an image forming apparatus which, when executed by a computer, cause the computer to perform the method according to claim 16.

18. A method for receiving a variable print job having a plurality of records each including page information of a plurality of pages, and based on the page information, outputting an output product including a master object and a variable object, the method comprising:

receiving a print job;

outputting processing for outputting the received print job as the output product;

detecting an error occurring during execution of the output processing;

interrupting, when the print job in which the error is detected is the variable print job, the output processing of the page included in the record which includes page information of the page in which the error is detected, and of the records included in the variable print job, restarting output processing from a page included in a record following the record which includes the page information of the page in which the error is detected;

storing information about the interrupted record;

notifying a user of the stored information; and interrupting, when a number of interrupted records exceeds a restriction value, the variable print job, and restarting output printing from a print job following the variable print job.

* * * * *